US012709177B2

(12) United States Patent
Slepchenkov et al.

(10) Patent No.: US 12,709,177 B2
(45) Date of Patent: Aug. 18, 2026

(54) SYSTEMS, DEVICES, AND METHODS FOR MODULE-BASED CASCADED ENERGY SYSTEMS HAVING RECONFIGURABLE ARRAYS

(71) Applicant: TAE Technologies, Inc., Foothill Ranch, CA (US)

(72) Inventors: Mikhail Slepchenkov, Lake Forest, CA (US); Roozbeh Naderi, Foothill Ranch, CA (US); Romi Sinclair Kadri, Santa Barbara, CA (US)

(73) Assignee: TAE Technologies, Inc., Foothill Ranch (CA)

( * ) Notice: Subject to any disclaimer, the term of this patent is extended or adjusted under 35 U.S.C. 154(b) by 978 days.

(21) Appl. No.: 17/856,697

(22) Filed: Jul. 1, 2022

(65) Prior Publication Data

US 2023/0001814 A1 Jan. 5, 2023

Related U.S. Application Data

(60) Provisional application No. 63/255,425, filed on Oct. 13, 2021, provisional application No. 63/217,871, filed on Jul. 2, 2021.

(51) Int. Cl.
*H02J 7/00* (2026.01)
*B60L 53/18* (2019.01)
*B60L 53/30* (2019.01)
*B60L 53/57* (2019.01)
*H02J 7/02* (2016.01)

(52) U.S. Cl.
CPC ............... *B60L 53/57* (2019.02); *B60L 53/18* (2019.02); *B60L 53/30* (2019.02); *H02J 7/02* (2013.01)

(58) Field of Classification Search
None
See application file for complete search history.

(56) References Cited

U.S. PATENT DOCUMENTS 5,204,548 A 4/1993 Daehler et al.
5,428,522 A 6/1995 Millner et al.
(Continued)

FOREIGN PATENT DOCUMENTS

CA 2810369 3/2012
CN 201789411 4/2011
(Continued)

OTHER PUBLICATIONS

Tolbert et al., "Charge Balance Control Schemes for Cascade Multi-level Converter in Hybrid Electric Vehicles," IEEE Trans. Indus. Electronics, Oct. 2002, 49(5):1058-1064.
(Continued)

*Primary Examiner* — Arun C Williams
(74) *Attorney, Agent, or Firm* — Alston & Bird LLP

(57) ABSTRACT

Example embodiments of systems, devices, and methods are provided herein for energy systems having multiple modules arranged in cascaded fashion for storing and discharging power. Each module includes an energy source and converter circuitry that selectively couples the energy source to other modules in the system. The modules can be arranged in serial arrays that in turn can be reconfigurably connected for interfacing the system with either an AC entity or a DC entity. Mobile charge stations having reconfigurable arrays are also disclosed.

20 Claims, 27 Drawing Sheets

(56) References Cited

U.S. PATENT DOCUMENTS 5,642,275 A 6/1997 Peng et al.
5,905,371 A 5/1999 Limpaecher
5,933,339 A 8/1999 Duba et al.
5,949,664 A 9/1999 Bernet et al.
6,051,961 A 4/2000 Jang et al.
6,058,032 A 5/2000 Yamanaka et al.
6,064,180 A 5/2000 Sullivan et al.
6,236,580 B1 5/2001 Aiello et al.
6,373,734 B1 4/2002 Martinelli
7,091,701 B2 8/2006 Turner et al.
7,485,987 B2 2/2009 Mori et al.
8,395,280 B2 3/2013 Graovac et al.
8,476,888 B1 7/2013 Chen et al.
8,503,202 B2 8/2013 Chimento et al.
8,614,525 B2 12/2013 Teichmann et al.
8,829,723 B2 9/2014 Graovac et al.
9,172,254 B2 10/2015 Ganor
9,444,275 B2 9/2016 Huang et al.
9,461,474 B2 10/2016 Deboy et al.
9,673,732 B2 6/2017 Deboy et al.
10,014,611 B2 7/2018 Götz
10,074,995 B2 9/2018 Smedley et al.
10,193,359 B2 1/2019 Ganor
10,218,189 B2 2/2019 Goetz
10,291,037 B2 5/2019 Birkl et al.
10,391,870 B2 8/2019 Götz et al.
10,396,682 B2 8/2019 Götz et al.
10,439,506 B2 10/2019 Götz
10,442,309 B2 10/2019 Götz
10,454,331 B2 10/2019 Götz
10,473,728 B2 11/2019 Goetz
10,630,201 B2 4/2020 Götz et al.
10,700,587 B2 6/2020 Götz
10,759,284 B2 9/2020 Jaensch et al.
10,784,698 B2 9/2020 Jaensch et al.
10,840,714 B2 11/2020 Götz et al.
10,980,103 B2 4/2021 Götz et al.
10,985,551 B2 4/2021 Götz
10,998,739 B2 5/2021 Hinterberger et al.
11,038,435 B2 6/2021 Götz
2003/0102845 A1 6/2003 Aker et al.
2004/0008016 A1 1/2004 Sutardja et al.
2004/0037101 A1 2/2004 Meynard et al.
2005/0065684 A1 3/2005 Larson et al.
2006/0097782 A1 5/2006 Ebner
2006/0202636 A1 9/2006 Schneider
2007/0147098 A1 6/2007 Mori et al.
2007/0194627 A1 8/2007 Mori et al.
2007/0246635 A1 10/2007 Nakajima et al.
2008/0080212 A1 4/2008 Grbovic
2008/0245593 A1 10/2008 Kim
2008/0304296 A1 12/2008 Nadimpalliraju et al.
2009/0251212 A1 10/2009 Pillonnet et al.
2009/0296442 A1* 12/2009 Chang .................... H02J 7/342 320/105
2009/0311891 A1 12/2009 Lawrence et al.
2010/0060235 A1 3/2010 Dommaschk et al.
2010/0085789 A1 4/2010 Ulrich et al.
2010/0121511 A1 5/2010 Onnerud et al.
2010/0298957 A1 11/2010 Sanchez Rocha et al.
2010/0301827 A1 12/2010 Chen et al.
2011/0133573 A1 6/2011 Ratnaparkhi et al.
2011/0140533 A1 6/2011 Zeng et al.
2011/0148198 A1 6/2011 Tripathi et al.
2011/0187184 A1 8/2011 Ichikawa
2011/0198936 A1 8/2011 Graovac et al.
2012/0053871 A1 3/2012 Sirard
2012/0074949 A1 3/2012 Kepley et al.
2012/0112693 A1 5/2012 Kusch et al.
2012/0155140 A1 6/2012 Chen et al.
2012/0161858 A1 6/2012 Permuy et al.
2012/0195084 A1 8/2012 Norrga
2012/0262967 A1 10/2012 Cuk
2013/0027126 A1 1/2013 Jayaraman et al.
2013/0083563 A1 4/2013 Wang et al.
2013/0088254 A1 4/2013 Hoang et al.
2013/0088903 A1 4/2013 Sagona et al.
2013/0090872 A1 4/2013 Kurimoto
2013/0154379 A1 6/2013 Tiefenbach
2013/0154521 A1 6/2013 Butzmann et al.
2013/0260188 A1 10/2013 Coates
2013/0285457 A1 10/2013 Kepley
2013/0302652 A1 11/2013 Wolff et al.
2014/0042815 A1 2/2014 Maksimovic et al.
2014/0042827 A1 2/2014 Wolff
2014/0104899 A1 4/2014 Fischer et al.
2014/0152109 A1 6/2014 Kanakasabai et al.
2014/0226379 A1 8/2014 Harrison
2014/0239927 A1 8/2014 Nascimento et al.
2014/0254219 A1 9/2014 Davies
2014/0340052 A1 11/2014 Dwertmann et al.
2014/0354212 A1 12/2014 Sugeno et al.
2015/0009594 A1 1/2015 Okaeme et al.
2015/0049532 A1 2/2015 Bernet et al.
2015/0124506 A1 5/2015 Sahoo et al.
2015/0229227 A1 8/2015 Aeloiza et al.
2015/0249351 A1 9/2015 Wolff et al.
2015/0270801 A1 9/2015 Kessler et al.
2015/0280604 A1 10/2015 Hassanpoor
2015/0288287 A1 10/2015 Madawala et al.
2015/0296292 A1 10/2015 Hogan et al.
2015/0303820 A1 10/2015 Cubaines
2015/0340964 A1 11/2015 Modeer
2015/0364935 A1 12/2015 Fetzer et al.
2016/0072396 A1 3/2016 Deboy et al.
2016/0183451 A1 6/2016 Conrad et al.
2016/0240894 A1 8/2016 Wartenberg et al.
2016/0254682 A1 9/2016 Yip et al.
2016/0308466 A1 10/2016 Oates
2017/0054306 A1 2/2017 Vo et al.
2017/0099007 A1 4/2017 Oates et al.
2017/0163171 A1 6/2017 Park
2017/0179745 A1 6/2017 Tritschler et al.
2017/0338654 A1 11/2017 Subramanian
2017/0366079 A1 12/2017 Bhowmik et al.
2018/0043789 A1 2/2018 Goetz
2018/0102706 A1* 4/2018 Gao .................... H02J 7/00714
2018/0175744 A1 6/2018 Jasim et al.
2018/0241239 A1 8/2018 Frost et al.
2019/0031042 A1 1/2019 Müller
2019/0126757 A1 5/2019 Kataoka et al.
2019/0131851 A1 5/2019 Herb
2019/0288522 A1 9/2019 Hinterberger et al.
2019/0288526 A1 9/2019 Jaensch et al.
2019/0288527 A1 9/2019 Jaensch et al.
2019/0288547 A1 9/2019 Jaensch et al.
2019/0288617 A1 9/2019 Jaensch et al.
2019/0312504 A1 10/2019 Kim et al.
2019/0337406 A1 11/2019 Mingenbach et al.
2020/0212687 A1 7/2020 Hinterberger et al.
2020/0235439 A1 7/2020 Frost et al.
2020/0244076 A1 7/2020 Wang et al.
2020/0278936 A1 9/2020 Gopalakrishnan et al.
2020/0307393 A1 10/2020 Slepchenkov et al.
2020/0307395 A1 10/2020 Slepchenkov et al.
2020/0317086 A1 10/2020 Goetz et al.
2020/0328593 A1 10/2020 Goetz
2020/0338997 A1 10/2020 Goetz et al.
2020/0358370 A1 11/2020 Goetz et al.
2020/0395840 A1 12/2020 Goetz
2021/0005855 A1 1/2021 Götz et al.
2021/0146791 A1 5/2021 Hinterberger et al.
2021/0151726 A1 5/2021 Hinterberger et al.
2021/0151727 A1 5/2021 Hinterberger et al.
2021/0151728 A1 5/2021 Hinterberger et al.
2021/0170887 A1 6/2021 Slepchenkov et al.
2021/0197676 A1 7/2021 Goetz et al.

(56) References Cited

U.S. PATENT DOCUMENTS

| | | | |
|---|---|---|---|
| 2021/0323426 A1* | 10/2021 | Hernández Bethencourt .............. H02J 7/0013 |
| 2022/0185127 A1 | 6/2022 | Singer et al. |

FOREIGN PATENT DOCUMENTS

| | | |
|---|---|---|
| CN | 204156591 | 2/2015 |
| CN | 103812377 | 5/2016 |
| DE | 102014008399 | 12/2015 |
| DE | 102016109077 | 11/2017 |
| DE | 102017220175 | 5/2019 |
| DE | 102018109921 | 8/2019 |
| DE | 102018109922 | 10/2019 |
| DE | 102018109925 | 10/2019 |
| DE | 102018003560 A1 | 11/2019 |
| DE | 102018109926 | 12/2019 |
| DE | 102018121403 | 3/2020 |
| DE | 102018121490 | 3/2020 |
| DE | 102018121547 | 3/2020 |
| DE | 102018126780 | 4/2020 |
| DE | 102018129111 | 5/2020 |
| DE | 102018126779 | 6/2020 |
| DE | 102019112826 | 6/2020 |
| DE | 102019102306 | 7/2020 |
| DE | 102019102311 | 7/2020 |
| DE | 102019103757 | 7/2020 |
| DE | 102019120615 | 8/2020 |
| DE | 102019112373 | 11/2020 |
| DE | 102019112823 | 11/2020 |
| DE | 102019120616 | 11/2020 |
| DE | 102019120947 | 11/2020 |
| DE | 102019125577 | 11/2020 |
| DE | 102019125578 | 11/2020 |
| DE | 102019120945 | 2/2021 |
| DE | 102019130736 | 5/2021 |
| DE | 102019130737 | 5/2021 |
| DE | 102019132685 | 6/2021 |
| DE | 102020117264 | 6/2021 |
| DE | 102020117435 | 6/2021 |
| DE | 102020118242 | 7/2021 |
| EP | 0907238 | 4/1999 |
| EP | 2290799 | 3/2011 |
| EP | 2658071 | 10/2013 |
| EP | 2693598 | 2/2014 |
| EP | 3790148 A1 | 3/2021 |
| JP | 2011-522510 A | 7/2011 |
| JP | 2019-088040 A | 6/2019 |
| JP | 2021-175208 A | 11/2021 |
| JP | 2022-527301 A | 6/2022 |
| WO | WO 2011/009689 | 1/2011 |
| WO | WO 2011/082855 | 7/2011 |
| WO | WO 2011/082856 | 7/2011 |
| WO | WO 2011/128133 | 10/2011 |
| WO | WO 2012/016735 | 2/2012 |
| WO | WO 2012/038162 | 3/2012 |
| WO | WO 2013/056900 | 4/2013 |
| WO | WO 2014/151178 | 9/2014 |
| WO | WO 2014/193254 | 12/2014 |
| WO | WO 2016/030144 | 3/2016 |
| WO | WO 2018/072837 | 4/2018 |
| WO | WO 2018/095552 | 5/2018 |
| WO | WO 2018/154206 | 8/2018 |
| WO | WO 2018/193173 | 10/2018 |
| WO | WO 2018/210451 | 11/2018 |
| WO | WO 2018/210452 | 11/2018 |
| WO | WO 2018/231810 | 12/2018 |
| WO | WO 2018/232403 | 12/2018 |
| WO | WO 2018/233871 | 12/2018 |
| WO | WO 2019/020215 | 1/2019 |
| WO | 2019/156192 A1 | 8/2019 |
| WO | WO 2019/161875 | 8/2019 |
| WO | WO 2019/166733 | 9/2019 |
| WO | WO 2019/180699 | 9/2019 |
| WO | WO 2019/183553 | 9/2019 |
| WO | WO 2020/059880 | 3/2020 |
| WO | WO 2020/078580 | 4/2020 |
| WO | WO 2020/205511 | 10/2020 |
| WO | WO 2020/205574 | 10/2020 |
| WO | WO 2020/243655 | 12/2020 |

OTHER PUBLICATIONS

International Search Report and Written Opinion in International Appln. No. PCT/US2022/035913, mailed on Oct. 31, 2022, 10 pages.

Mayet et al., "Simulation and Control of a New Integrated Battery System for Automotive Applications," Proceedings of PCIM Europe Digital Days 2021, Virtual Event, May 3-7, 2021, 6 pages.

De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.

"Capacitor Voltage Control Technique for a Modular Converter", An IP.com Prior Art Database Technical Disclosure, Jun. 10, 2015, pp. 1-7.

Bode, G.H., et al., "Hysteresis Current Regulation for Single-Phase Multilevel Inverters Using Asynchronous State Machines", 29th Annual Conference of the IEEE Industrial Electronics Society, Piscataway, NJ, 2003, pp. 1203-4208.

Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.

Debnath, S., et al., "Operation, Control, and Applications of the Modular Multilevel Converter: A Review", IEEE Transactions on Power Electronics, 2015, vol. 30, No. 1, pp. 37-53.

EP 18816636.7 Extended Search Report, Feb. 19, 2021, 11 pages.

EP 18817541.8 Supplementary Search Report, Jan. 20, 2021, 5 pages.

EP 18817541.8 Written Opinion, Feb. 2, 2021, 6 pages.

Farr, E., et al., "A Sub-module Capacitor Voltage Balancing Scheme for the Alternate Arm Converter (AAC)", 15th European Conference on IEEE Power Electronics and Applications, 2013, pp. 1-10.

Gelman, V., "Energy Storage That May Be Too Good to Be True", IEEE Vehicular Technology Magazine, 2031, pp. 70-80.

Gupta, R., et al., "Cascaded Multilevel Control of DSTATCOM Using Multiband Hysteresis Modulation", IEEE Power Engineering Society General Meeting, Piscataway, NJ, 2006, pp. 1-7.

Hassanpoor, A., et al., "Tolerance Band Modulation Methods for Modular Multilevel Converters", IEEE Transactions on Power Electronics, 2015, vol. 30, No. 1, pp. 311-326.

Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.

Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.

Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.

Konstantinou, G., et al., "A Hybrid Modular Multilevel Converter with Partial Embedded Energy Storage", Energies, 2016, vol. 9, No. 12, pp. 1-18.

Li, N., et al., "SOH Balancing Control Method for the MMC Battery Energy Storage System", IEEE Transactions on Industrial Electronics, 2018, vol. 65, No. 8, pp. 6581-6591.

Loh, P. C., et al., "A Reduced Common Mode Hysteresis Current Regulation Strategy for Multilevel Inverters", 18th Annual IEEE Applied Power Electronics Conference and Exposition, Miami Beach, FL, 2003, vol. 1, pp. 576-582.

(56) References Cited

OTHER PUBLICATIONS

Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.
Maharjan, L., et al., "Fault-Tolerant Operation of a Battery-Energy-Storage System Based on a Multilevel Cascade PWM Converter With Star Configuration", IEEE Transactions on Power Electronics, 2010, vol. 25, No. 9, pp. 2386-2396.
Maharjan, L., et al., "State-of-Charge (SOC)-Balancing Control of a Battery Energy Storage System Based on a Cascade PWM Converter", IEEE Transactions on Power Electronics, 2009, vol. 24, No. 6, pp. 1628-1636.
Mello, J.P.R., et al., "Multilevel Reduced Controlled Switches AC-DC Power Conversion Cells", IEEE Energy Conversion Congress and Exposition (ECCE), 2015, pp. 3815-3822.
Naderi, R., "Battery Management Converter System and Multilevel Converter Topology and Control", 2016, Dissertation at the University of California, Irvine, pp. 1-211.
Naderi, R., et al., "A Correction to the State-Machine-Decoder for Stacked Multicell Converters", IEEE Applied Power Electronics Conference and Exposition (APEC), 2014, pp. 1545-1549.
Naderi, R., et al., "A New Hybrid Active Neutral Point Clamped Flying Capacitor Multilevel Inverter", IEEE Applied Power Electronics Conference and Exposition (APEC), 2015, pp. 794-798.
Naderi, R., et al., "Dual Flying Capacitor Active-Neutral-Point-Clamped Multilevel Converter", IEEE Transactions on Power Electronics, 2016, vol. 31, No. 9, pp. 6476-6484.
Naderi, R., et al., "Phase-Shifted Carrier PWM Technique for General Cascaded Inverters", IEEE Transactions on Power Electronics, 2008, vol. 23, No. 3, pp. 1257-1269.
P., S., et al., "Seven Level Inverter Topologies: A Comparative Study", International Journal of Innovative Research in Electrical, Electronics, Instrumentation and Control Engineering, 2016, vol. 3, No. 1, pp. 148-162.
Sangiri, J. B., et al., "Modular Multilevel Converter for Multifunctional Battery Management System of Electric Vehicle", 44th Annual Conference of the IEEE Industrial Electronics Society, 2018, pp. 1333-1338.
SG 11201912049P Written Opinion, Mar. 10, 2021, _ pages.
Shimada, M., et al., "Energy-saving Technology for Railway Traction Systems Using Onboard Storage Batteries", Hitachi Review, 2012, vol. 61, No. 7, pp. 312-318.
Tajeddine, K., et al., "A Cascaded H-Bridge Multilevel Inverter with SOC Battery Balancing", International Journal of Advanced Computer Science and Applications, 2017, vol. 8, No. 12, pp. 345-350.
Varghese, K., "Implementation of Single Phase Seven Level Cascaded Multilevel Inverter With Reduced No of Switches", Project Report'15, retrieved from https://www.academia.edu/12826368/single_phase_seven_level_cascaded_multilevel_inverter, pp. 1-45.
Venu, K., et al., "A Seven Level Single-Phase Cascaded Inverter with Improved Efficiency", International Journal & Magazine of Engineering, Technology, Management and Research, 2016, vol. 3, No. 10, pp. 243-249.
WO PCT/US18/37081 ISR and Written Opinion, Oct. 17, 2018, 21 pages.
WO PCT/US18/38089 ISR and Written Opinion, Oct. 29, 2018, 18 pages.
WO PCT/US19/23695 ISR and Written Opinion, Aug. 12, 2019, 15 pages.
WO PCT/US21/27154 ISR and Written Opinion, Oct. 14, 2021, 19 pages.
WO PCT/US21/27159 ISR and Written Opinion, Sep. 1, 2021, 10 pages.
WO PCT/US21/32295 ISR and Written Opinion, Sep. 14, 2021, 16 pages.
Wu, B., et al., "Analysis of a distributed maximum power point tracking tracker with low input voltage ripple and flexible gain range", IET Power Electron., 2016, vol. 9, No. 6, pp. 1220-1227.
Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.
Extended European Search Report Mailed on Apr. 17, 2025 for EP Application No. 22834293, 8 page(s).
English Translation of JP Office Action dated May 22, 2026 for JP Application No. 2023580743, 7 page(s).
JP Office Action Mailed on May 22, 2026 for JP Application No. 2023580743, 3 page(s).

* cited by examiner

SYSTEMS, DEVICES, AND METHODS FOR MODULE-BASED CASCADED ENERGY SYSTEMS HAVING RECONFIGURABLE ARRAYS

CROSS REFERENCE TO RELATED APPLICATIONS

This application claims the benefit of, and priority to U.S. Provisional Application No. 63/217,871, filed Jul. 2, 2021 and U.S. Provisional Application No. 63/255,425, filed Oct. 13, 2021, which are incorporated by reference in their entirety for all purposes.

FIELD

The subject matter described herein relates generally to systems, devices, and methods for module-based cascaded energy systems having reconfigurable arrays for receiving and generating power in various formats.

BACKGROUND

Energy storage systems for buffering electrical energy are in use today. However, the systems typically utilize a large number of batteries connected in series. The serial arrangement is highly inflexible and severely limits the range of applications for which the energy storage system can be used. Complex and expensive power conversion equipment was required to interface the serial energy buffers to different power sources.

As such, a need exists for improved energy storage systems capable of interfacing with different power sources in a flexible and efficient manner.

SUMMARY

Example embodiments of systems, devices, and methods are provided herein for energy systems having multiple modules arranged in cascaded fashion for storing and discharging power. These multiple modules can be arranged in multiple serial arrays and the modules within each array can be individually controlled such that the array is capable of outputting a cumulative voltage signal in an AC or DC format, where the cumulative voltage signal is a superposition of the voltages generated by each module of the array. The arrays can be connected together using an arrangement of conductors and switches that permits the arrays to be reconfigured for interfacing the energy system with either a DC or AC entity. Such reconfiguration permits the system to receive power from a source of a first type, either AC or DC, to buffer the power, and to output the power to the DC or AC entity. Applications for the reconfigurable arrays are described, such as stationary and mobile charge stations.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
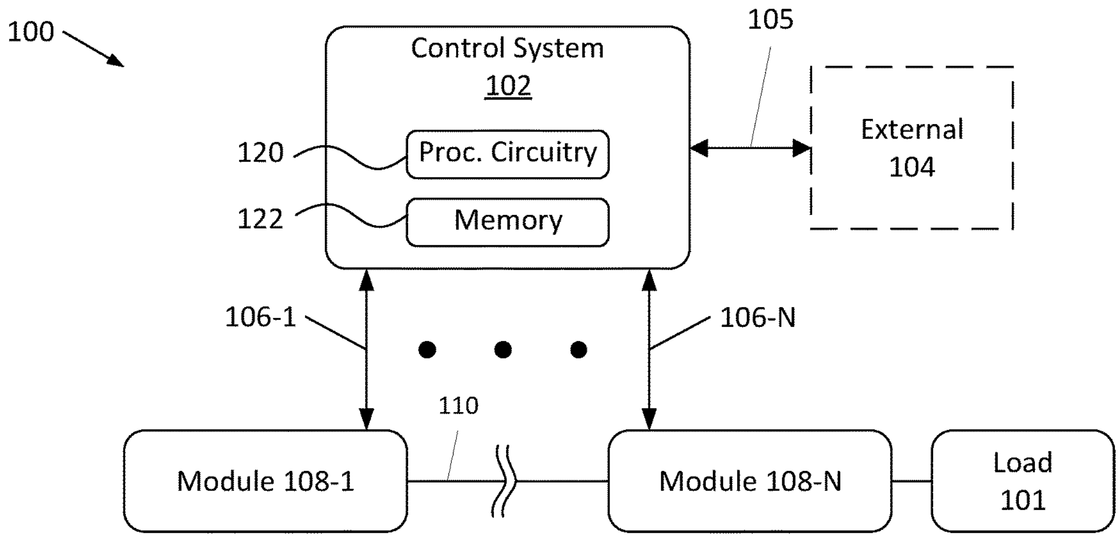
FIGS. 1A-1C are block diagrams depicting example embodiments of a modular energy system.

Before the present subject matter is described in detail, it is to be understood that this disclosure is not limited to the particular embodiments described, as such may, of course, vary. The terminology used herein is for the purpose of describing particular embodiments only, and is not intended to be limiting, since the scope of the present disclosure will be limited only by the appended claims.

Before describing the example embodiments pertaining to charge stations based on modular energy systems, it is first useful to describe these underlying systems in greater detail. With reference to FIGS. 1A through 10F, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, micro-grid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Module-Based Energy System Examples

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
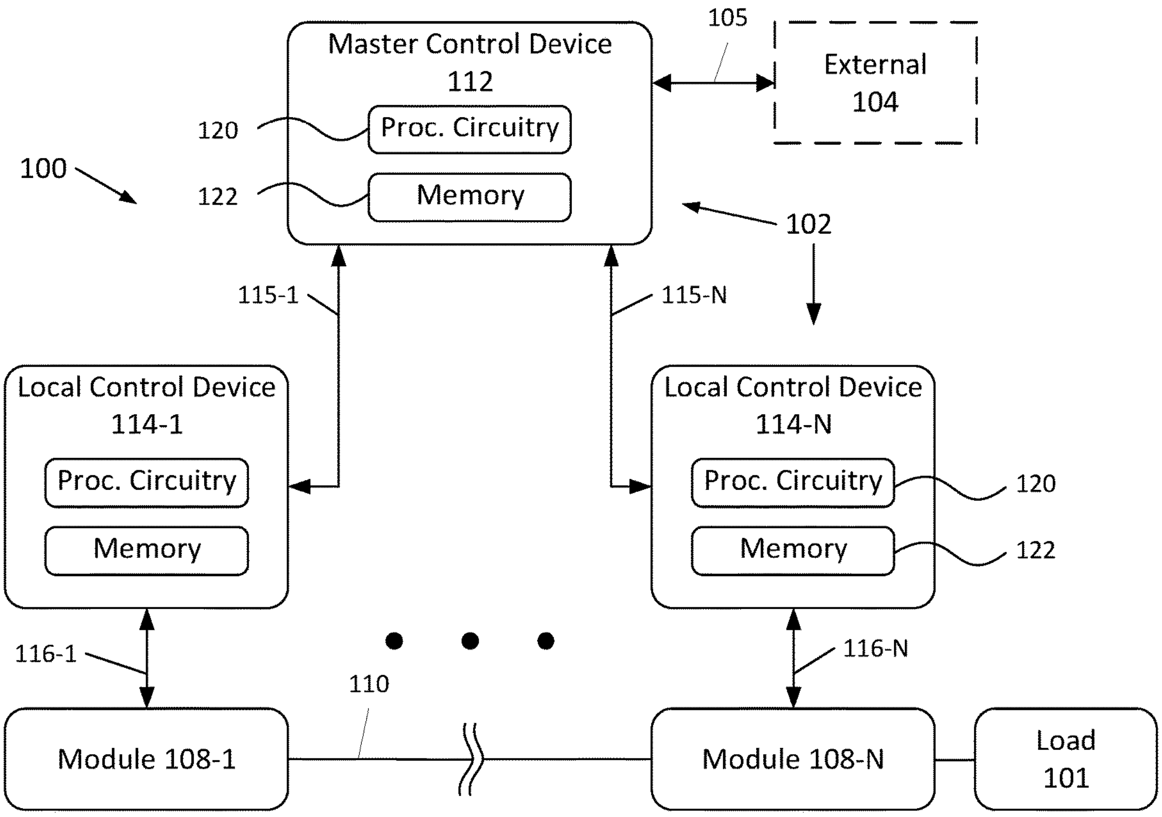

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

Figure 1C:
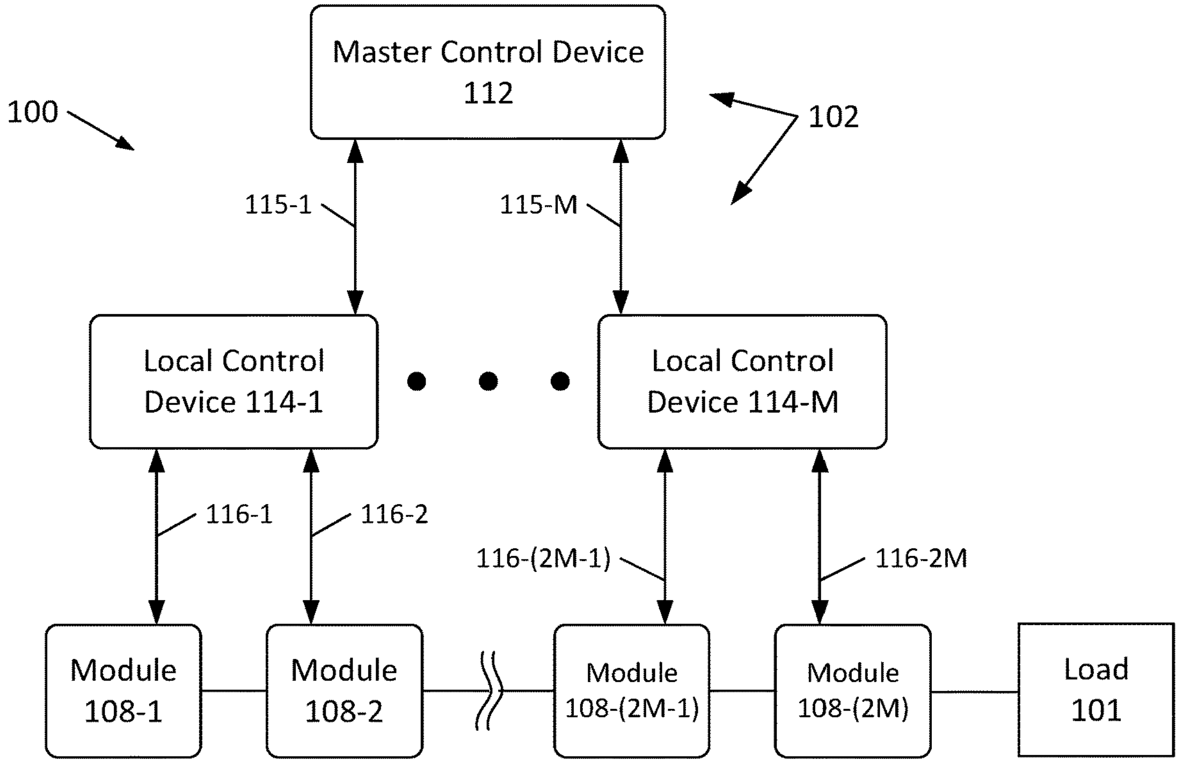

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data can be communicated in a standardized (e.g., IEEE, ANSI) or custom (e.g., proprietary) format. In automotive applications, communication paths 115 can be configured to communicate according to FlexRay or CAN protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information received from the same or different one or more of modules 108. Control can also be based on one or more other factors, such as requirements of load 101. Controllable aspects include, but are not limited to, one or more of voltage, current, phase, and/or output power of each module 108.

Status information of every module 108 in system 100 can be communicated to control system 102, which can independently control every module 108-1 . . . 108-N. Other variations are possible. For example, a particular module 108 (or subset of modules 108) can be controlled based on status information of that particular module 108 (or subset), based on status information of a different module 108 that is not that particular module 108 (or subset), based on status information of all modules 108 other than that particular module 108 (or subset), based on status information of that particular module 108 (or subset) and status information of at least one other module 108 that is not that particular module 108 (or subset), or based on status information of all modules 108 in system 100.

The status information can be information about one or more aspects, characteristics, or parameters of each module 108. Types of status information include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, State of Power (SOP) (e.g., the available power limitation of the energy source during discharge and/or charge), State of Energy (SOE) (e.g., the present level of available energy of an energy source relative to the maximum available energy of the source), and/or the presence of absence of a fault in any one or more of the components of the module.

LCDs 114 can be configured to receive the status information from each module 108, or determine the status information from monitored signals or data received from or within each module 108, and communicate that information to MCD 112. In some embodiments, each LCD 114 can communicate raw collected data to MCD 112, which then algorithmically determines the status information on the basis of that raw data. MCD 112 can then use the status information of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information and assess that information to determine a difference between at least one module 108 (e.g., a component thereof) and at least one or more other modules 108 (e.g., comparable components thereof). For example, MCD 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information to predetermined thresholds, limits, or conditions, and not necessarily by comparison to statuses of other modules 108. The aspredetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information for that module 108 indicates it to be operating in violation (e.g., above or below) of a predetermined threshold or limit, or outside of a predetermined range of acceptable operating conditions. Similarly, MCD 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether. For example, if a fault occurs in a given module, then MCD 112 or LCD 114 can cause that module to enter a bypass state as described herein.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation (or operative state) between modules 108 that would otherwise exist.

MCD 112 can communicate control information to LCD 114 for the purpose of controlling the modules 108 associated with the LCD 114. The control information can be, e.g., a modulation index and a reference signal as described herein, a modulated reference signal, or otherwise. Each LCD 114 can use (e.g., receive and process) the control information to generate switch signals that control operation of one or more components (e.g., a converter) within the associated module(s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (or subsystem), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

Figure 1D:
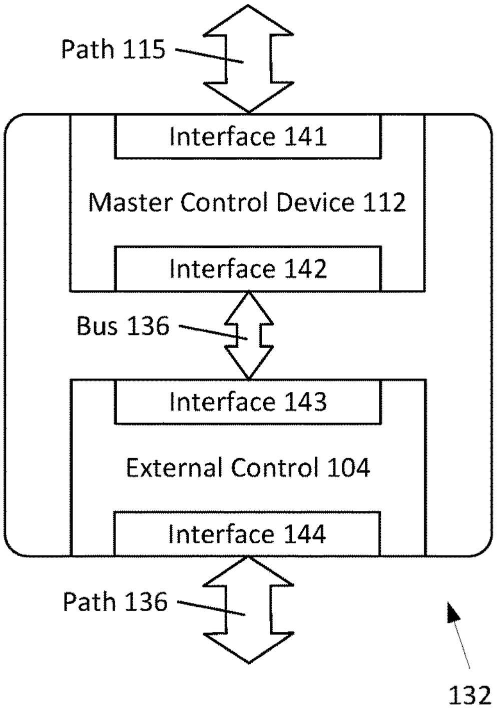
FIGS. 1D-1E are block diagrams depicting example embodiments of control devices for an energy system.
Figure 1E:
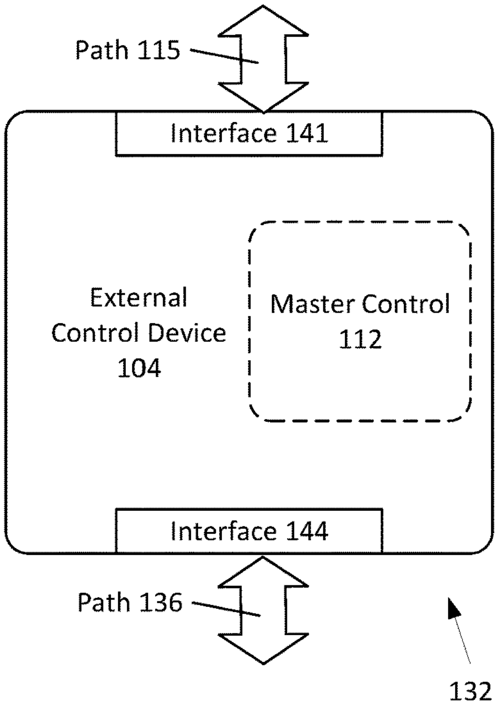
Figure 1F:
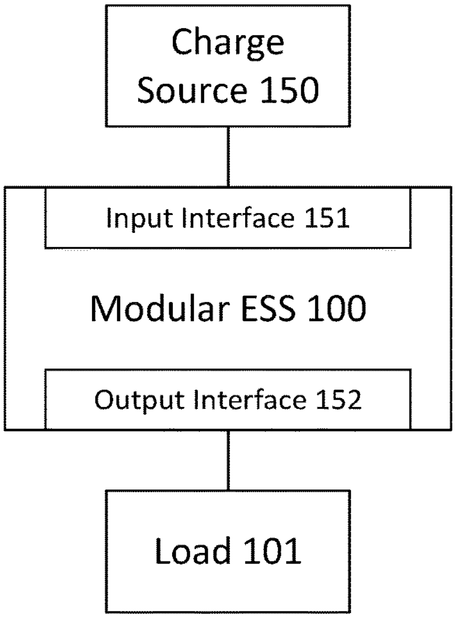
FIGS. 1F-1G are block diagrams depicting example embodiments of modular energy systems coupled with a load and a charge source.
Figure 1G:
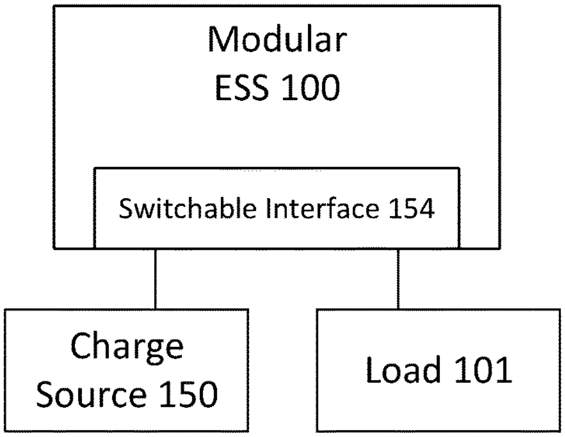

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or subsystem) 132. In some embodiments, local control functionality is implemented within a device shared with another component of each module 108, such as a Battery Management System (BMS).

Examples of Modules within Cascaded Energy Systems

Figure 2A:
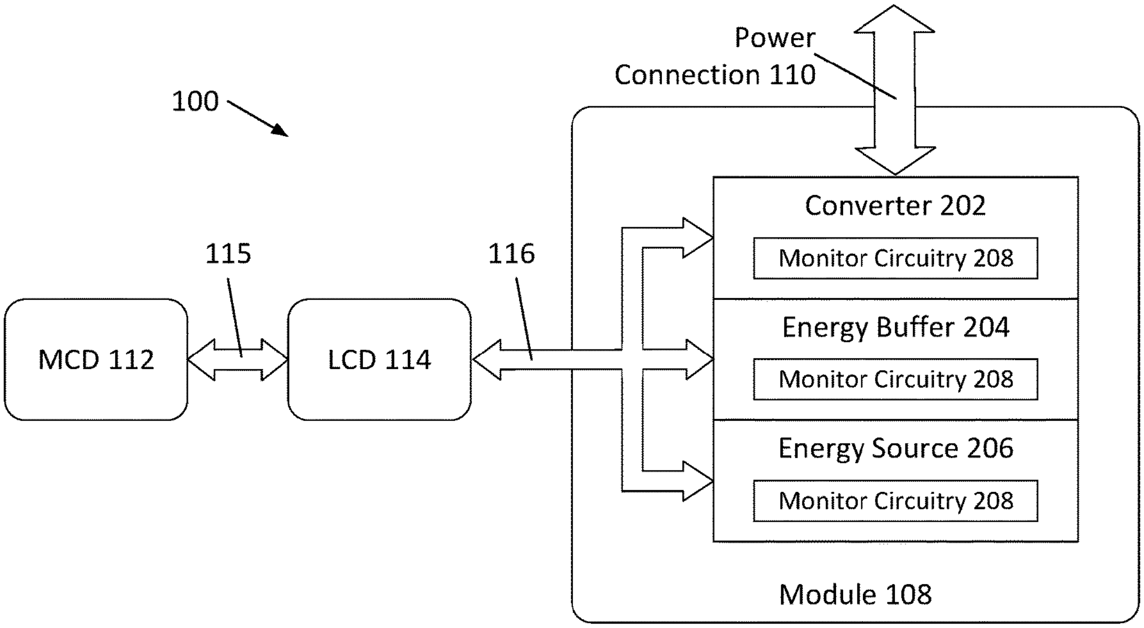
FIGS. 2A-2B are block diagrams depicting example embodiments of a module and control system within an energy system.
Figure 2B:
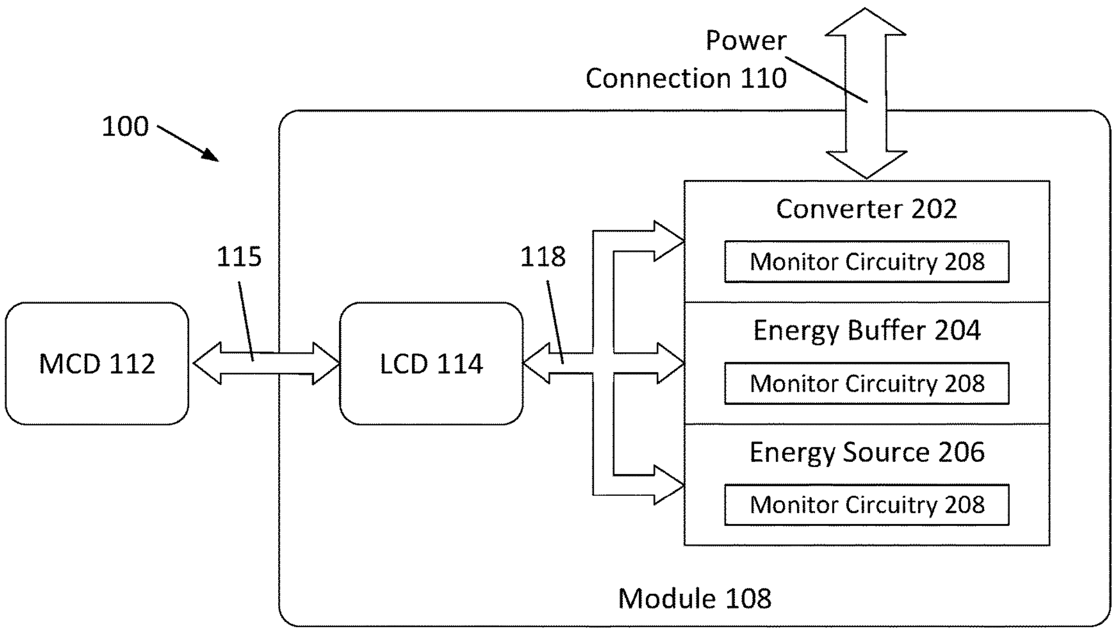

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 204 into an alternating current (AC) signal and output it over power connection 110 (e.g., an inverter). Converter 202 can also receive an AC or DC signal over connection 110 and apply it to energy source 204 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Figure 4A:
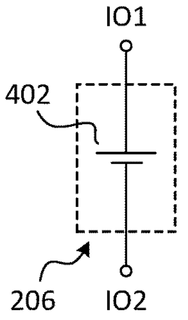
FIGS. 4A-4F are schematic views depicting example embodiments of energy sources.
Figure 4B:
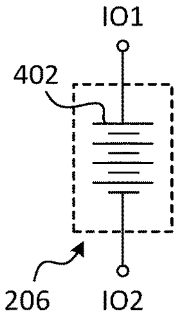
Figure 4C:
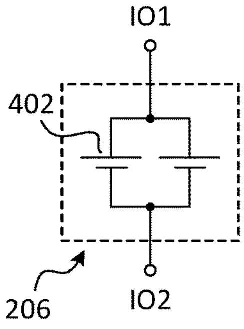
Figure 4D:
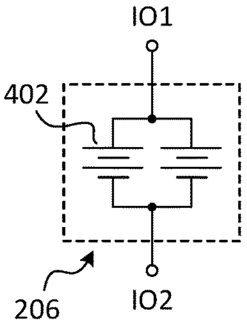

Energy source 206 is preferably a robust energy storage device capable of outputting direct current and having an energy density suitable for energy storage applications for electrically powered devices. Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of multiple (e.g., four) cells 402 (FIG. 4B), a battery module with a parallel connection of single cells 402 (FIG. 4C), and a battery module with a parallel connection with legs having two cells 402 each (FIG. 4D). A non-exhaustive list of examples of battery types is set forth elsewhere herein.

Energy source 206 can also be a high energy density (HED) capacitor, such as an ultracapacitor or supercapacitor. An HED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Energy source 206 can also be a fuel cell. The fuel cell can be a single fuel cell, multiple fuel cells connected in series or parallel, or a fuel cell module. Examples of fuel cell types include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of source classes (e.g., batteries, capacitors, and fuel cells) and types (e.g., chemistries and/or structural configurations within each class) are not intended to form an exhaustive list, and those of ordinary skill in the art will recognize other variants that fall within the scope of the present subject matter.

Energy buffer 204 can dampen or filter fluctuations in current across the DC line or link (e.g., $+V_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports IO3 and IO4 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information (or can be used to determine status information by, e.g., LCD 114). A main function of the status information is to describe the state of the one or more energy sources 206 of the module 108 to enable determinations as to how much to utilize the energy source in comparison to other sources in system 100, although status information describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuitry 208 can be separate from the various components 202, 204, and 206, or can be integrated with each component 202, 204, and 206 (as shown in FIGS. 2A-2B), or any combination thereof. In some embodiments, monitor circuitry 208 can be part of or shared with a Battery Management System (BMS) for a battery energy source 204. Discrete circuitry is not needed to monitor each type of status information, as more than one type of status information can be monitored with a single circuit or device, or otherwise algorithmically determined without the need for additional circuits.

LCD 114 can receive status information (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information from module components. For example, LCD 114 can cause the status information to be transmitted over paths 116, 118 by requesting the status information directly, or by applying a stimulus (e.g., voltage) to cause the status information to be generated, in some cases in combination with switch signals that place converter 202 in a particular state.

Figure 2C:
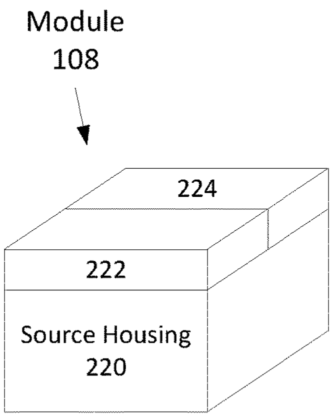
FIG. 2C is a block diagram depicting an example embodiment of a physical configuration of a module.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry, a second housing 222 that holds module electronics such as converter 202, energy buffer 204, and other accompany electronics such as monitor circuitry, and a third housing 224 that holds LCD 114 (not shown) for the module 108. In alternative embodiments the module electronics and LCD 114 can be housed within the same single housing. In still other embodiments, the module electronics, LCD 114, and energy source(s) can be housed within the same single housing for the module 108. Electrical connections between the various module components can proceed through the housings 220, 222, 224 and can be exposed on any of the housing exteriors for connection with other devices such as other modules 108 or MCD 112.

Figure 2D:
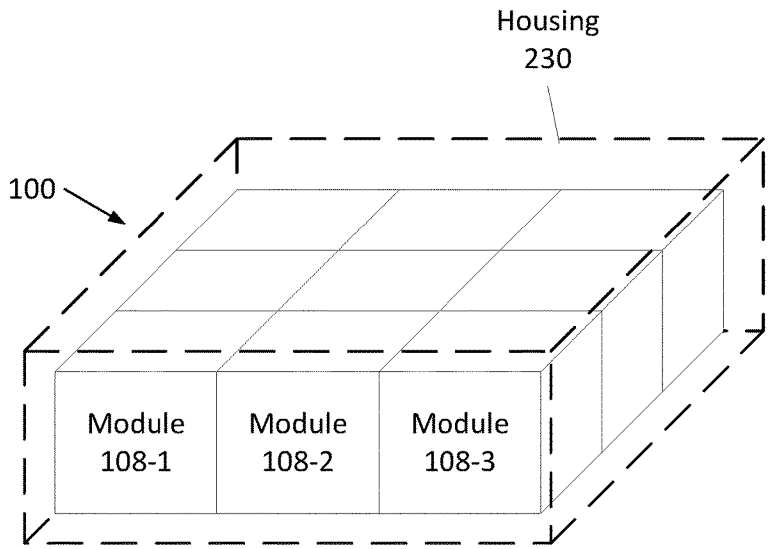
FIG. 2D is a block diagram depicting an example embodiment of a physical configuration of a modular energy system.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
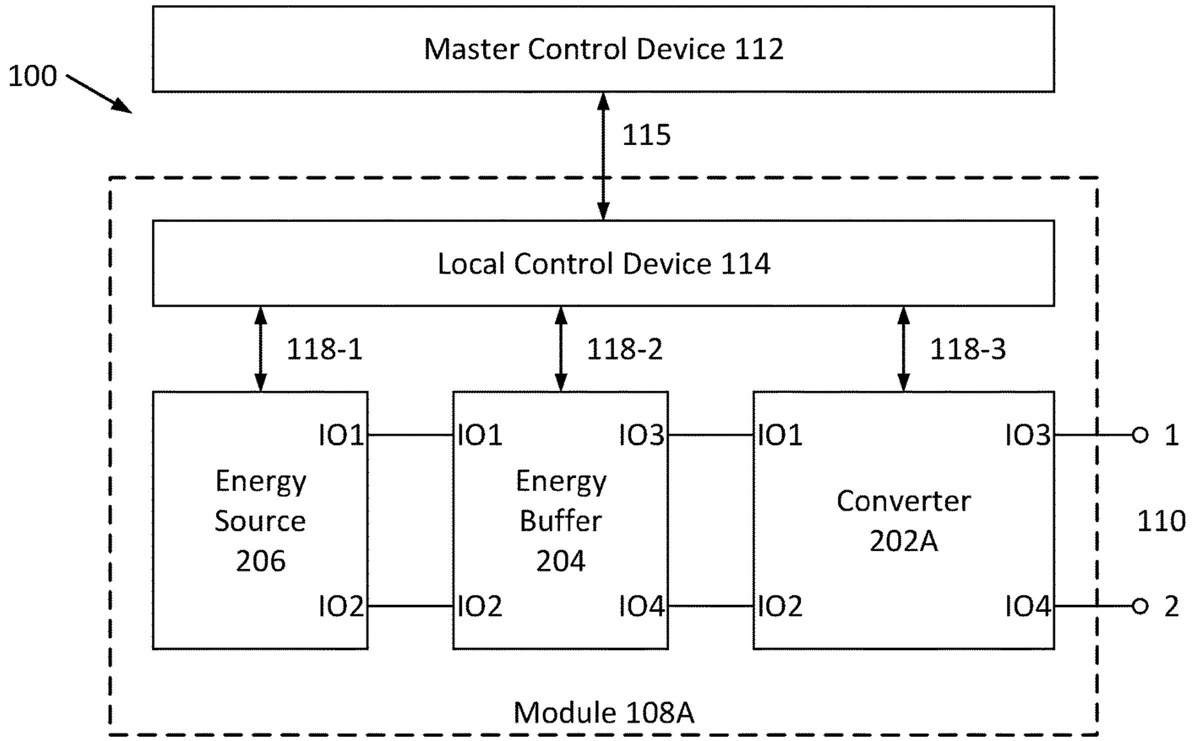
FIGS. 3A-3C are block diagrams depicting example embodiments of modules having various electrical configurations.
Figure 3B:
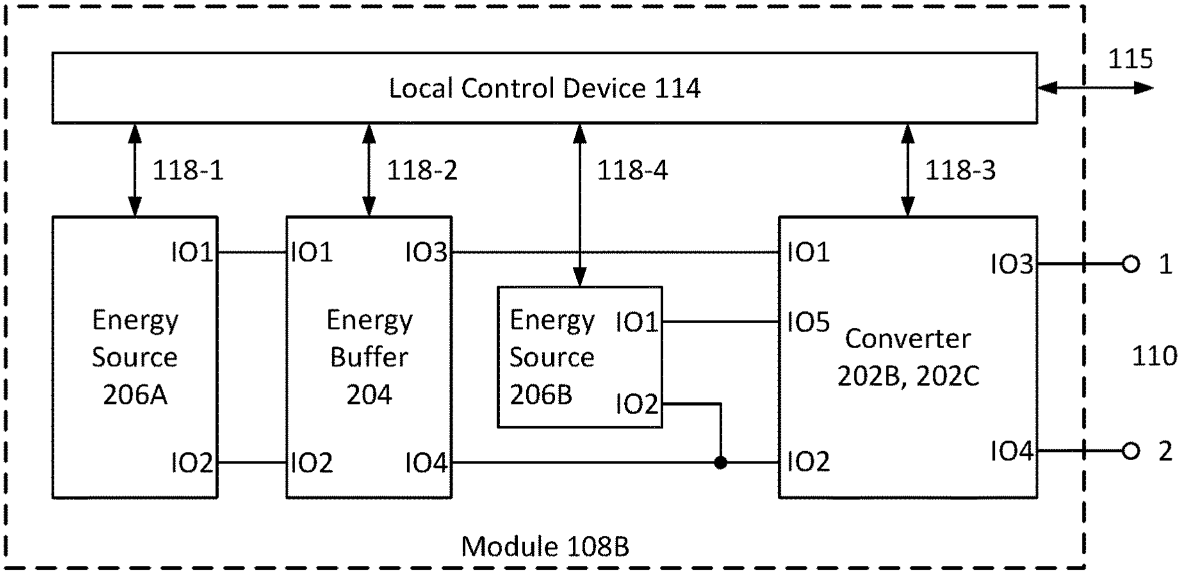
Figure 3C:
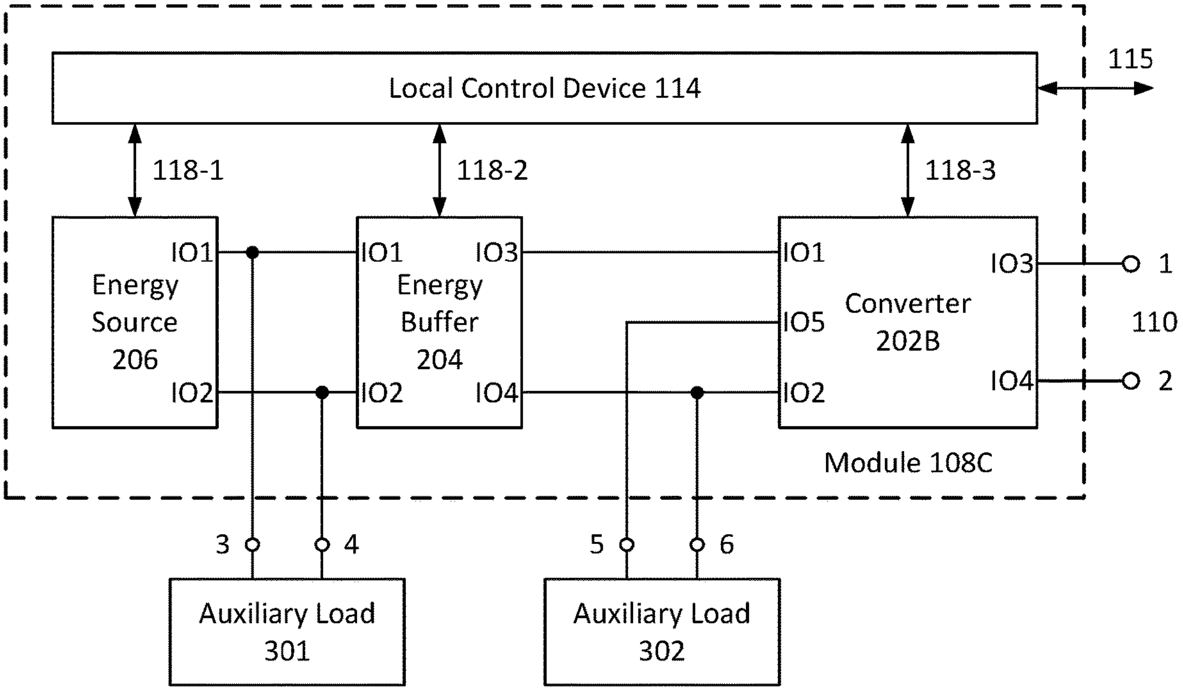

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Figure 5A:
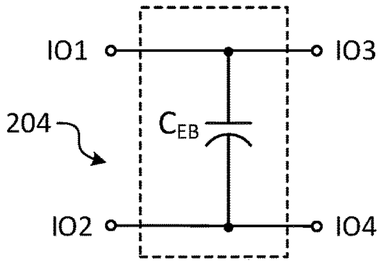
FIGS. 5A-5C are schematic views depicting example embodiments of energy buffers.
Figure 5B:
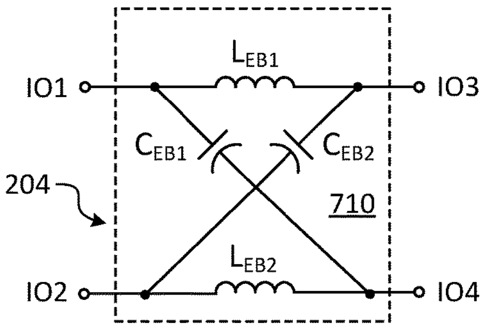
Figure 5C:
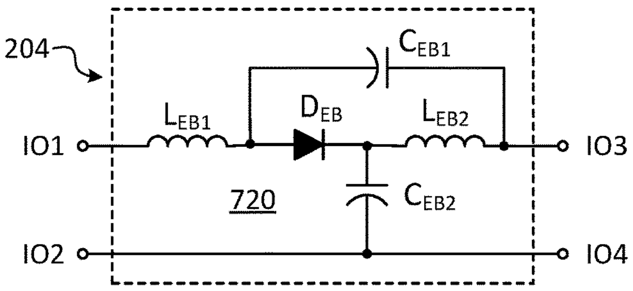

Energy source 206 can be configured as any of the energy source types described herein (e.g., a battery as described with respect to FIGS. 4A-4D, an HED capacitor, a fuel cell, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
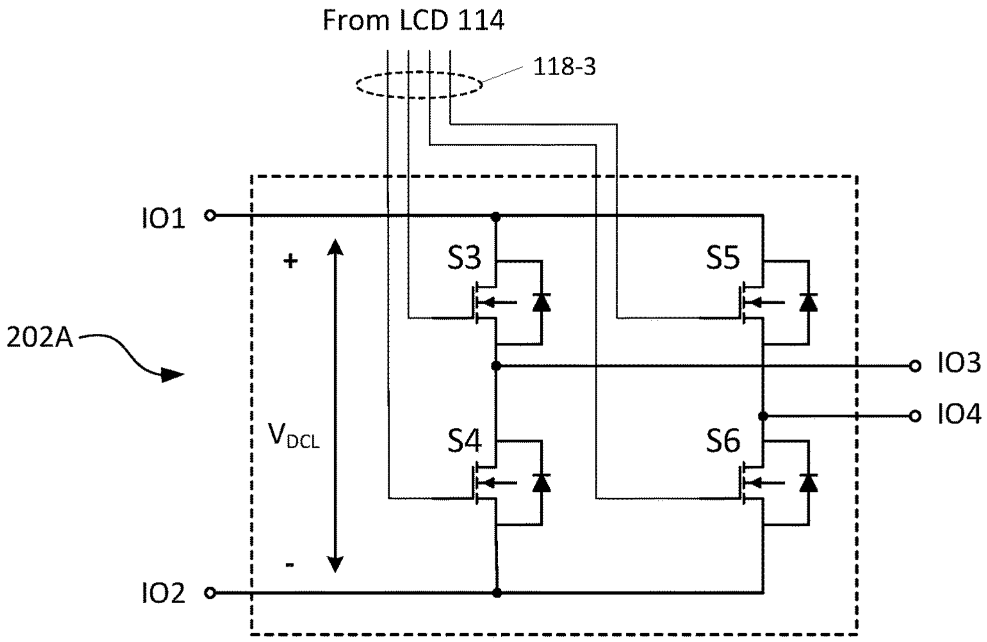
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports IO1 and IO2 and switch to generate pulses at ports IO3 and IO4. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports IO3 and IO4 by different combinations of switches S3, S4, S5, S6, converter 202 can generate three different voltage outputs at ports IO3 and IO4: $+V_{DCL}$, 0, and $-V_{DCL}$. A switch signal provided to each switch controls whether the switch is on (closed) or off (open). To obtain $+V_{DCL}$, switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and IO4 of converter 202 can be connected to (or form) module IO ports 1 and 2 of power connection 110, so as to generate the output voltage for use with output voltages from other modules 108.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange energy between them, e.g., one source 206 can charge another source 206. Each of the sources 206 can be configured as any energy source described herein (e.g., battery, HED capacitor, fuel cell). Each of the sources 206 can be the same class (e.g., each can be a battery, each can be an HED capacitor, or each can be a fuel cell), or a different class (e.g., a first source can be a battery and a second source can be an HED capacitor or fuel cell, or a first source can be an HED capacitor and a second source can be a fuel cell).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports IO5 and IO2, respectively, of converter 202B (also connected to port IO4 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

Figure 4E:
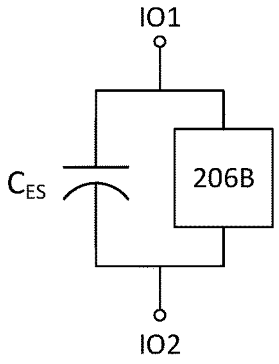
Figure 4F:
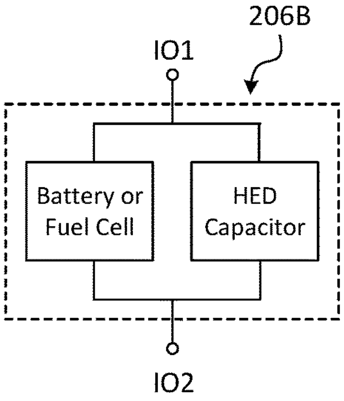

As mentioned both primary source 206A and secondary source 206B can be utilized simultaneously or at separate times depending on the switch state of converter 202B. If at the same time, an electrolytic and/or a film capacitor ($C_{ES}$) can be placed in parallel with source 206B as depicted in FIG. 4E to act as an energy buffer for the source 206B, or energy source 206B can be configured to utilize an HED capacitor in parallel with another energy source (e.g., a battery or fuel cell) as depicted in FIG. 4F.

Figure 6B:
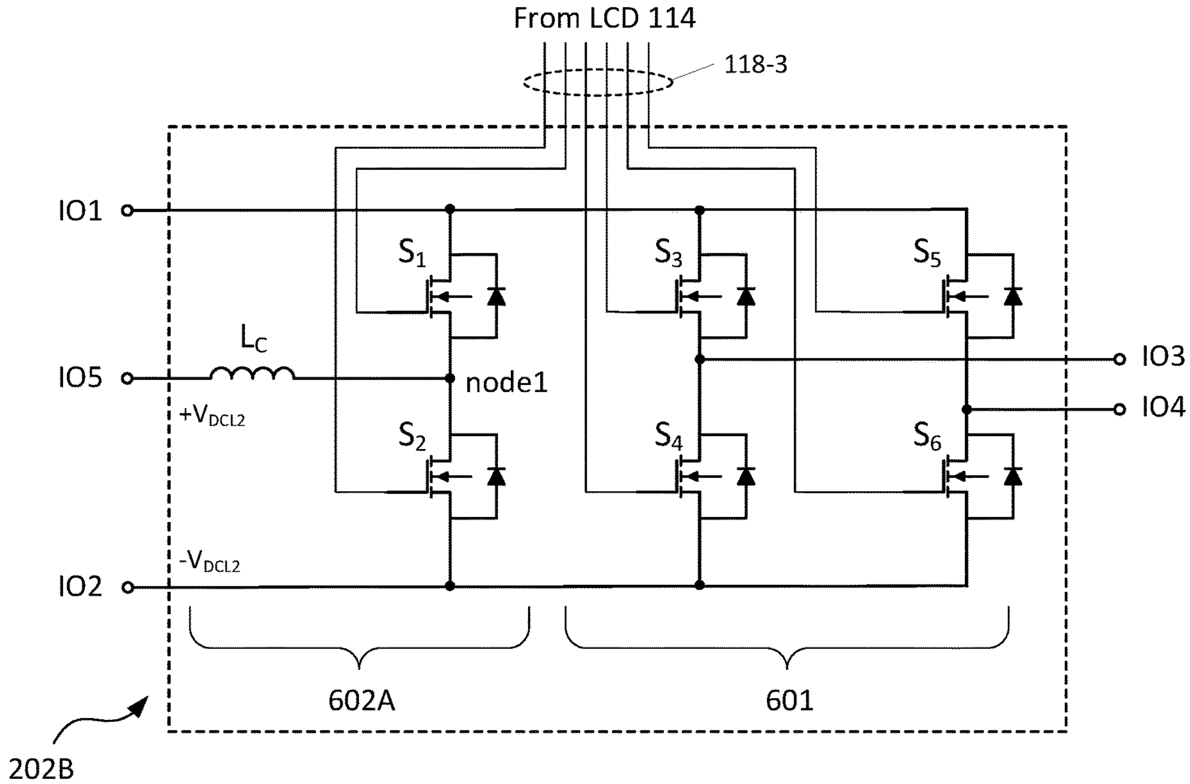
Figure 6C:
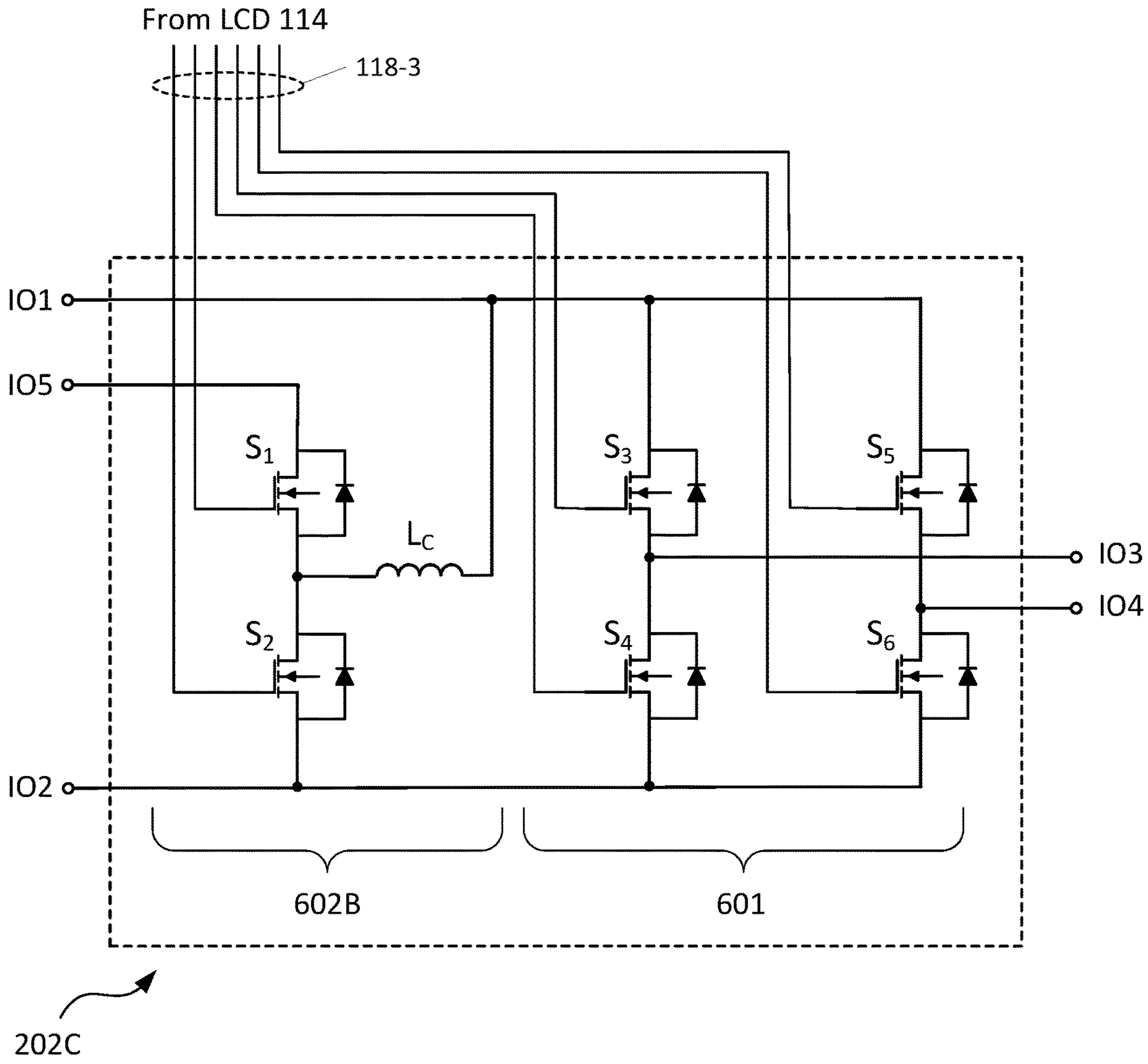

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple IO1 and IO2 to either of IO3 and IO4, thereby changing the output voltages of module 108B. Portion 602A includes switches S1 and S2 configured as a half bridge and coupled between ports IO1 and IO2. A coupling inductor $L_C$ is connected between port IO5 and a node1 present between switches S1 and S2 such that switch portion 602A is a bidirectional converter that can regulate (boost or buck) voltage (or inversely current). Switch portion 602A can generate two different voltages at node1, which are $+V_{DCL2}$ and 0, referenced to port IO2, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports IO5 and IO2. A coupling inductor $L_C$ is connected between port IO1 and a node1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114. In some embodiments, driver circuitry for generating the switching signals can be present in or associated with MCD 112 and/or LCD 114.

The aforementioned zero voltage configuration for converter 202 (turning on S3 and S5 with S4 and S6 off, or turning on S4 and S6 with S3 and S5 off) can also be referred to as a bypass state for the given module. This bypass state can be entered if a fault is detected in the given module, or if a system fault is detected warranting shut-off of more than one (or all modules) in an array or system. A fault in the module can be detected by LCD 114 and the control switching signals for converter 202 can be set to engage the bypass state without intervention by MCD 112. Alternatively, fault information for a given module can be communicated by LCD 114 to MCD 112, and MCD 112 can then make a determination whether to engage the bypass state, and if so, can communicate instructions to engage the bypass state to the LCD 114 associated with the module having the fault, at which point LCD 114 can output switching signals to cause engagement of the bypass state.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. The active filtering function can also be performed by modules having a typical electrolytic capacitor instead of a secondary energy source. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206. Source 206 can output power to both power connection 110 and load 301. Second auxiliary load 302 requires a constant voltage lower than that of source 206. Load 302 is coupled to IO ports 5 and 6 of module 108C, which are coupled to ports IO5 and IO2, respectively, of converter 202B. Converter 202B can include switch portion 602 having coupling inductor $L_C$ coupled to port IO5 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port IO5 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, over-voltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information; and/or transmission of the status information to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between IO1 and IO2 or between IO3 and IO4). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information, with which LCD 114 can perform one or more of the following: set or output a warning or alarm indication; communicate the status information to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Cascaded Energy System Topology Examples

Figure 7C:
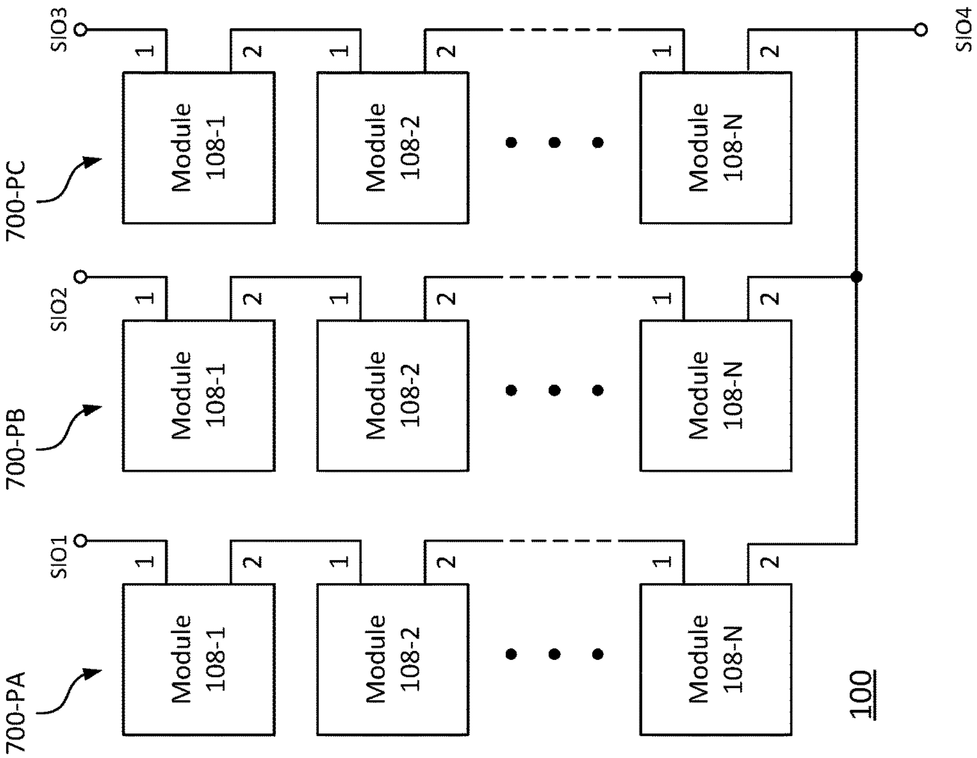
FIGS. 7A-7E are block diagrams depicting example embodiments of modular energy systems having various topologies.

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 . . . 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal produced by a single module 108 having a 48 volt energy source. FIG. 8B is a plot of voltage versus time depicting an example single phase AC output signal generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

Figure 7B:
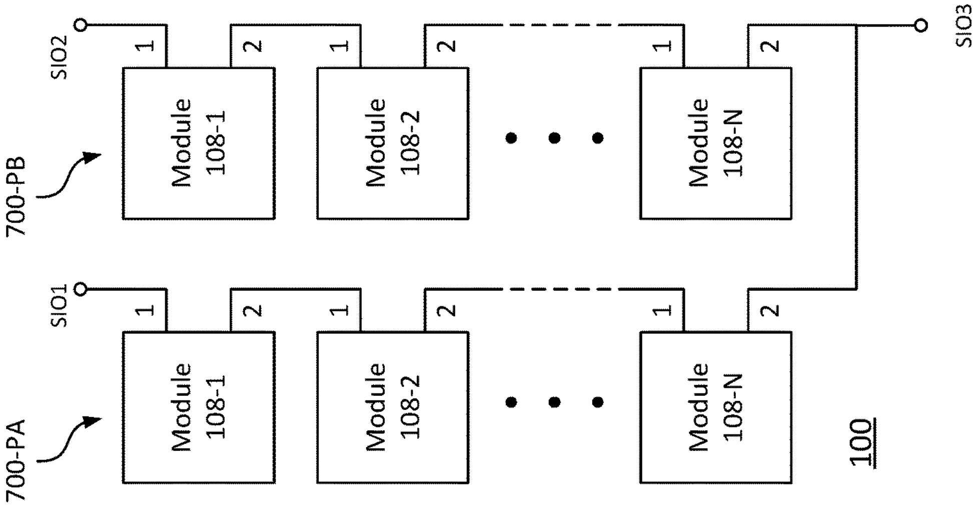
Figure 7A:
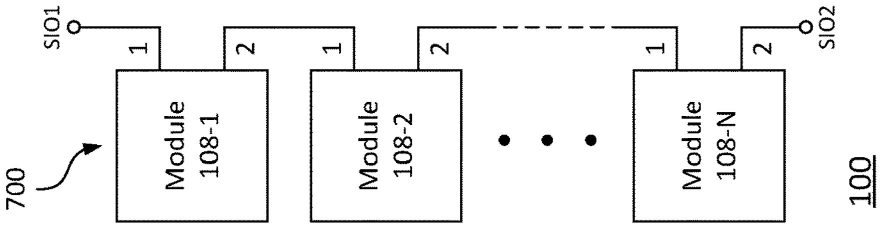

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system IO ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart): system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
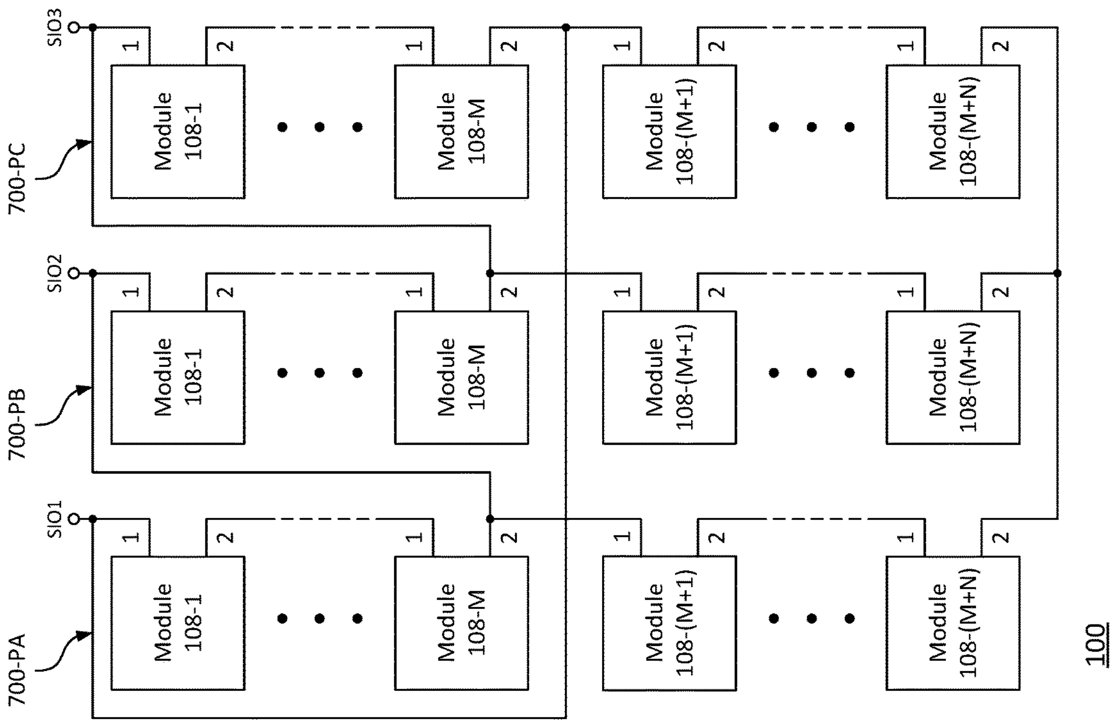
Figure 7D:
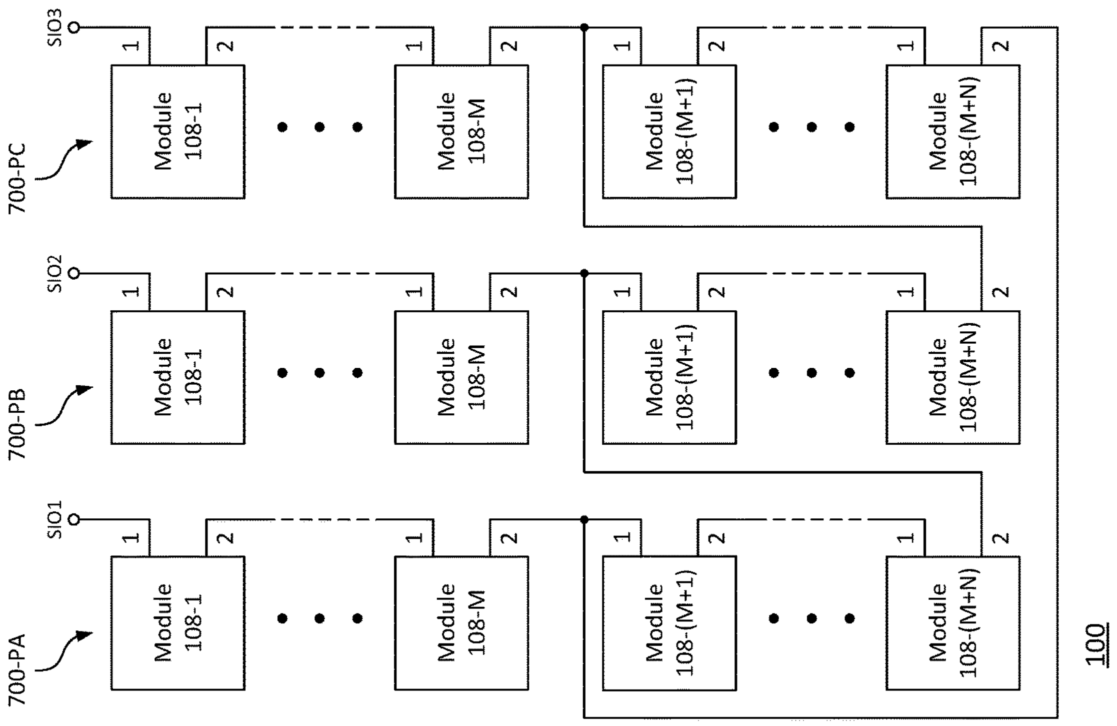

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Control Methodology Examples

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
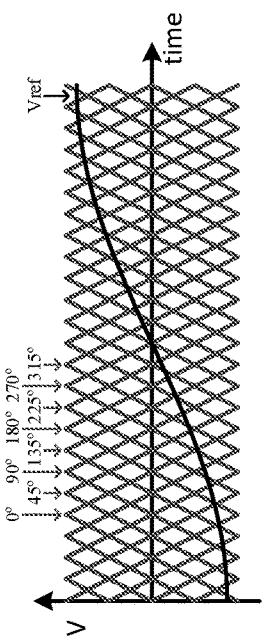
FIG. 8C is a plot depicting an example reference signal and carrier signals usable in a pulse width modulation control technique.
Figure 8D:
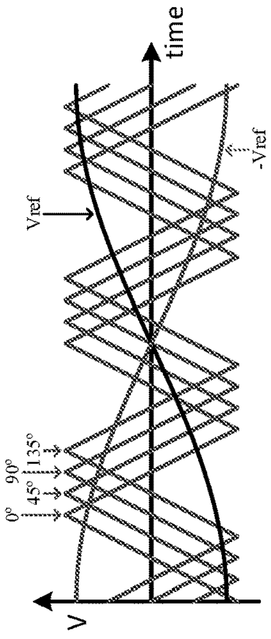
FIG. 8D is a plot depicting example reference signals and carrier signals usable in a pulse width modulation control technique.
Figure 8E:
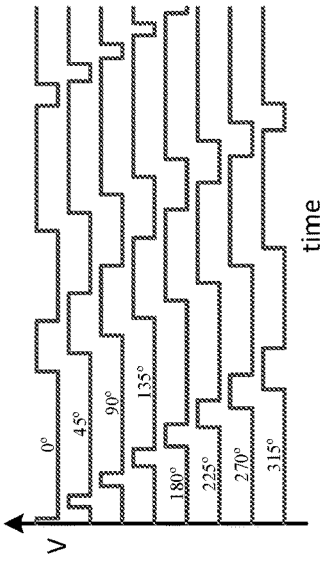
FIG. 8E is a plot depicting example switch signals generated according to a pulse width modulation control technique.
Figure 8F:
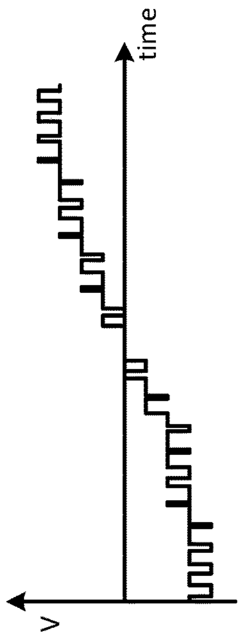
FIG. 8F as a plot depicting an example multilevel output voltage generated by superposition of output voltages from an array of modules under a pulse width modulation control technique.
Figure 8A:
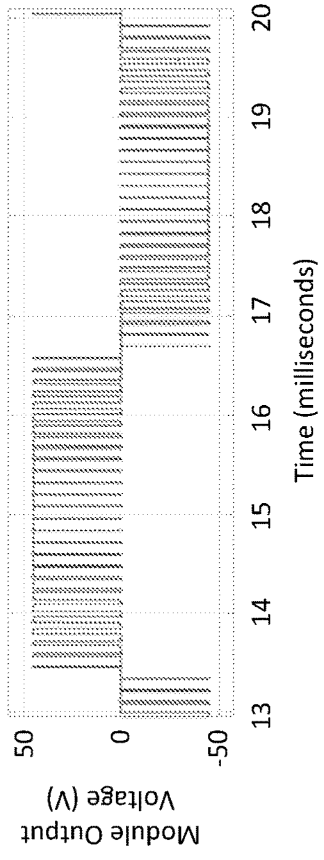
FIG. 8A is a plot depicting an example output voltage of a module.
Figure 8B:
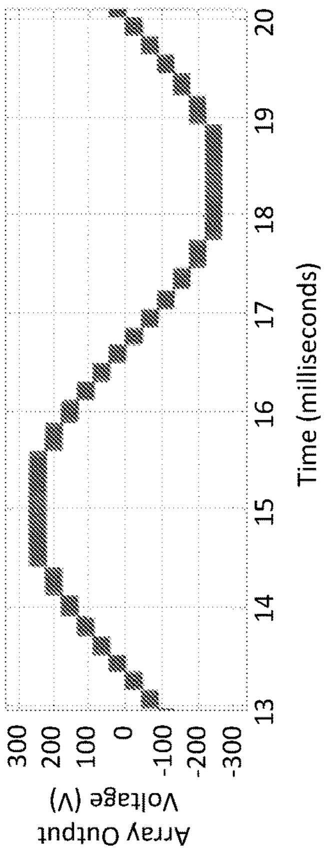
FIG. 8B is a plot depicting an example multilevel output voltage of an array of modules.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of (X−1)/2 two-level PWM waveforms. These two-level waveforms can be generated by comparing a reference waveform Vref to carriers incrementally shifted by 360°/(X−1). The carriers are triangular, but the embodiments are not limited to such. A nine-level example is shown in FIG. 8C (using four modules 108). The carriers are incrementally shifted by 360°/(9−1)=45° and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first (N−1)/2 carriers. A nine-level example is shown in FIG. 8D. In this example, the 0° to 135° switching signals (FIG. 8E) are generated by comparing +Vref to the 0° to 135° carriers of FIG. 8D and the 180° to 315° switching signals are generated by comparing −Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals.

The relative utilizations of each module 108 can adjusted based on status information to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra array or intraphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
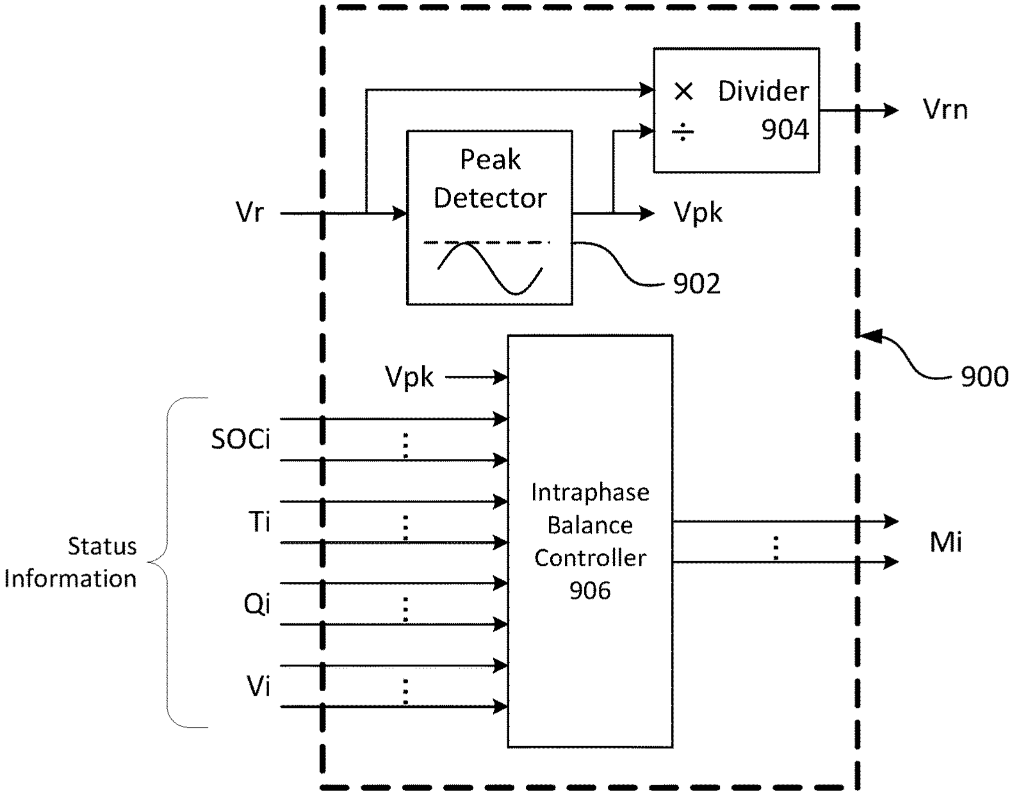
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra array) balance controller 906. Array controller 900 can receive a reference voltage waveform (Vr) and status information about each of the N modules 108 in the array (e.g., state of charge (SOCi), temperature (Ti), capacity (Qi), and voltage (Vi)) as inputs, and generate a normalized reference voltage waveform (Vrn) and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk=M_1V_1+M_2V_2+M_3V_3 \ldots +M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source(s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
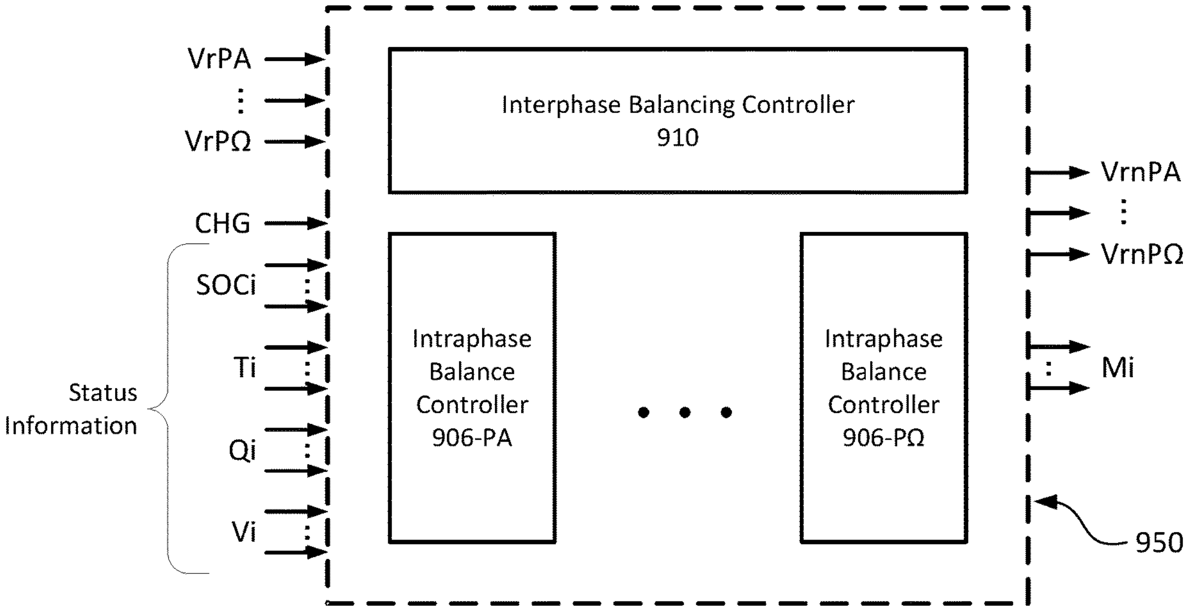

Balancing between arrays 700 of different phases (or arrays of the same phase, e.g., if parallel arrays are used) can be performed concurrently with intraphase balancing. FIG. 9B depicts an example embodiment of an Ω-phase (or Ω-array) controller 950 configured for operation in an Ω-phase system 100, having at least Ω arrays 700, where Ω is any integer greater than one. Controller 950 can include one interphase (or interarray) controller 910 and Ω intraphase balance controllers 906-PA . . . 906-PΩ for phases PA through PΩ, as well as peak detector 902 and divider 904 (FIG. 9A) for generating normalized references VrnPA through VrnPΩ from each phase-specific reference VrPA through VrPΩ. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrPΩ to generate normalized waveforms VrnPA through VrnPΩ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Interconnection (IC) Module Examples

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figure 10B:
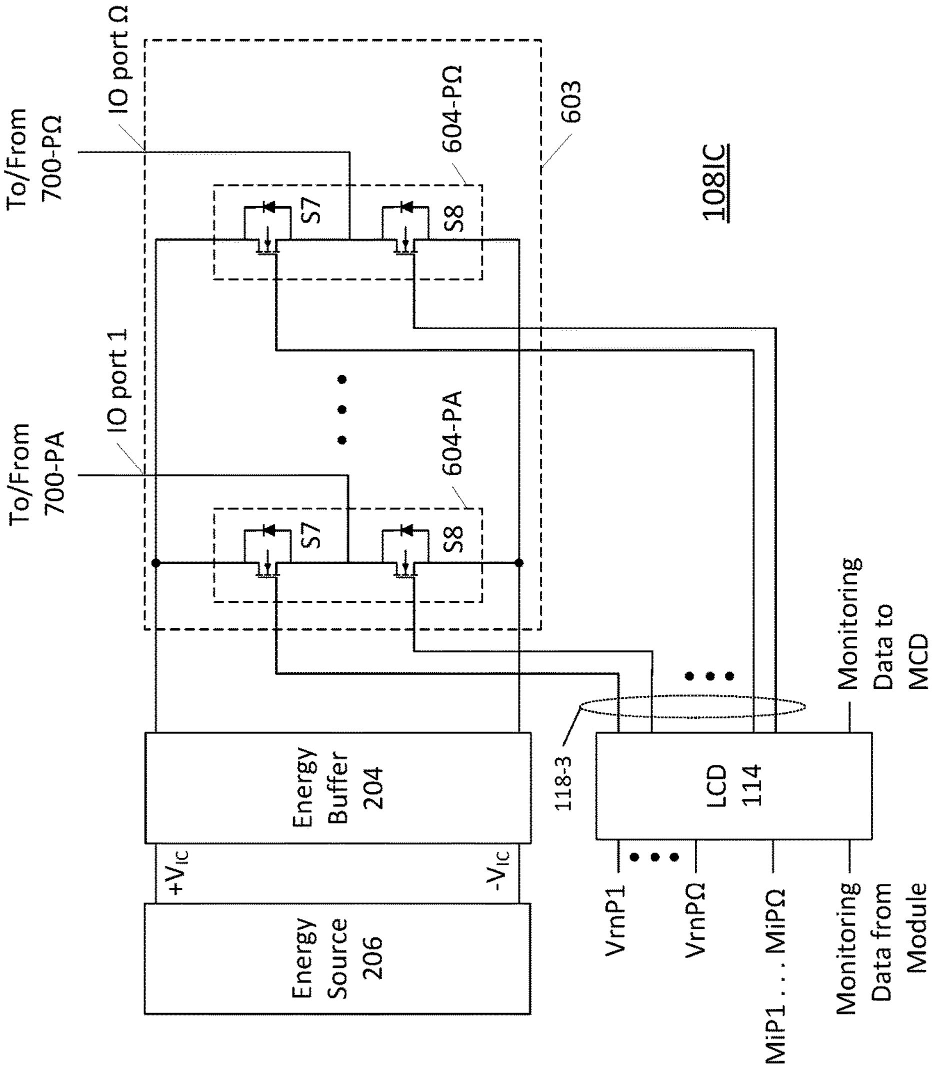
FIG. 10B is a schematic diagram depicting an example embodiment of an interconnection module in the multiphase embodiment of FIG. 10A.
Figure 10A:
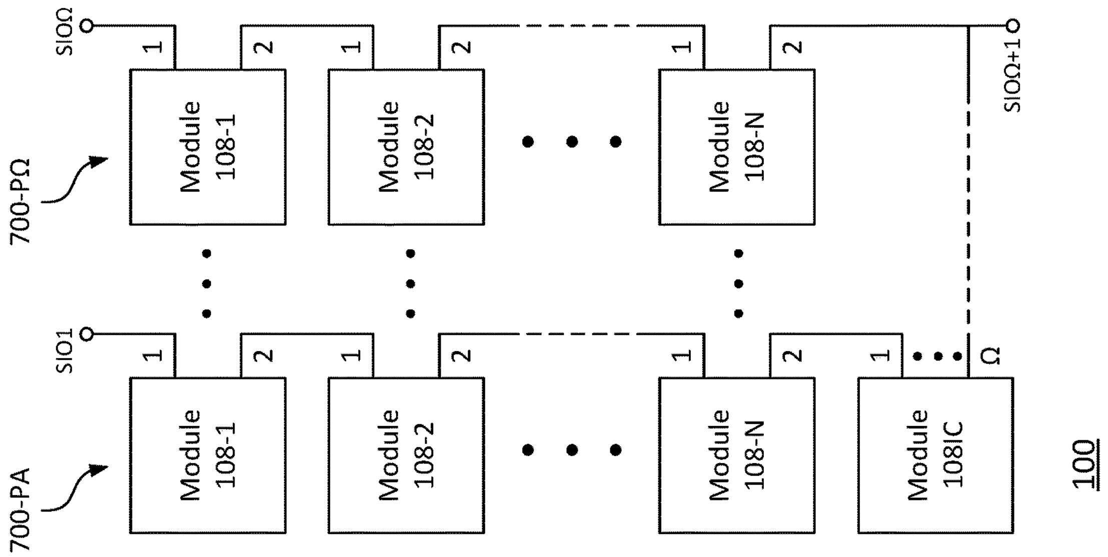
FIG. 10A is a block diagram depicting an example embodiment of a multiphase modular energy system having interconnection module.

FIG. 10A is a block diagram depicting an example embodiment of a system 100 capable of producing Ω-phase power with Ω arrays 700-PA through 700-PΩ, where Ω can be any integer greater than one. In this and other embodiments, IC module 108IC can be located on the rail side of arrays 700 such the arrays 700 to which module 108IC are connected (arrays 700-PA through 700-PΩ in this embodiment) are electrically connected between module 108IC and outputs (e.g., SIO1 through SIOΩ) to the load. Here, module 108IC has Ω IO ports for connection to IO port 2 of each module 108-N of arrays 700-PA through 700-PΩ. In the configuration depicted here, module 108IC can perform interphase balancing by selectively connecting the one or more energy sources of module 108IC to one or more of the arrays 700-PA through 700-PΩ (or to no output, or equally to all outputs, if interphase balancing is not required). System 100 can be controlled by control system 102 (not shown, see FIG. 1A).

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-PΩ for independently connecting energy source 206 to each of arrays 700-PA through 700-PΩ, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-PΩ can be controlled by control system 102 to selectively couple voltage $+V_{IC}$ or $-V_{IC}$ to the respective module I/O ports 1 through Ω. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information from monitor circuitry of module 108IC. This monitoring data and/or other status information derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-PQ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnPΩ. LCD 114 can also receive modulation indexes MiPA through MiPΩ for the switch units 604-PA through 604-PΩ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PΩ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with S2 switch portions 604 coupled with S2 different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
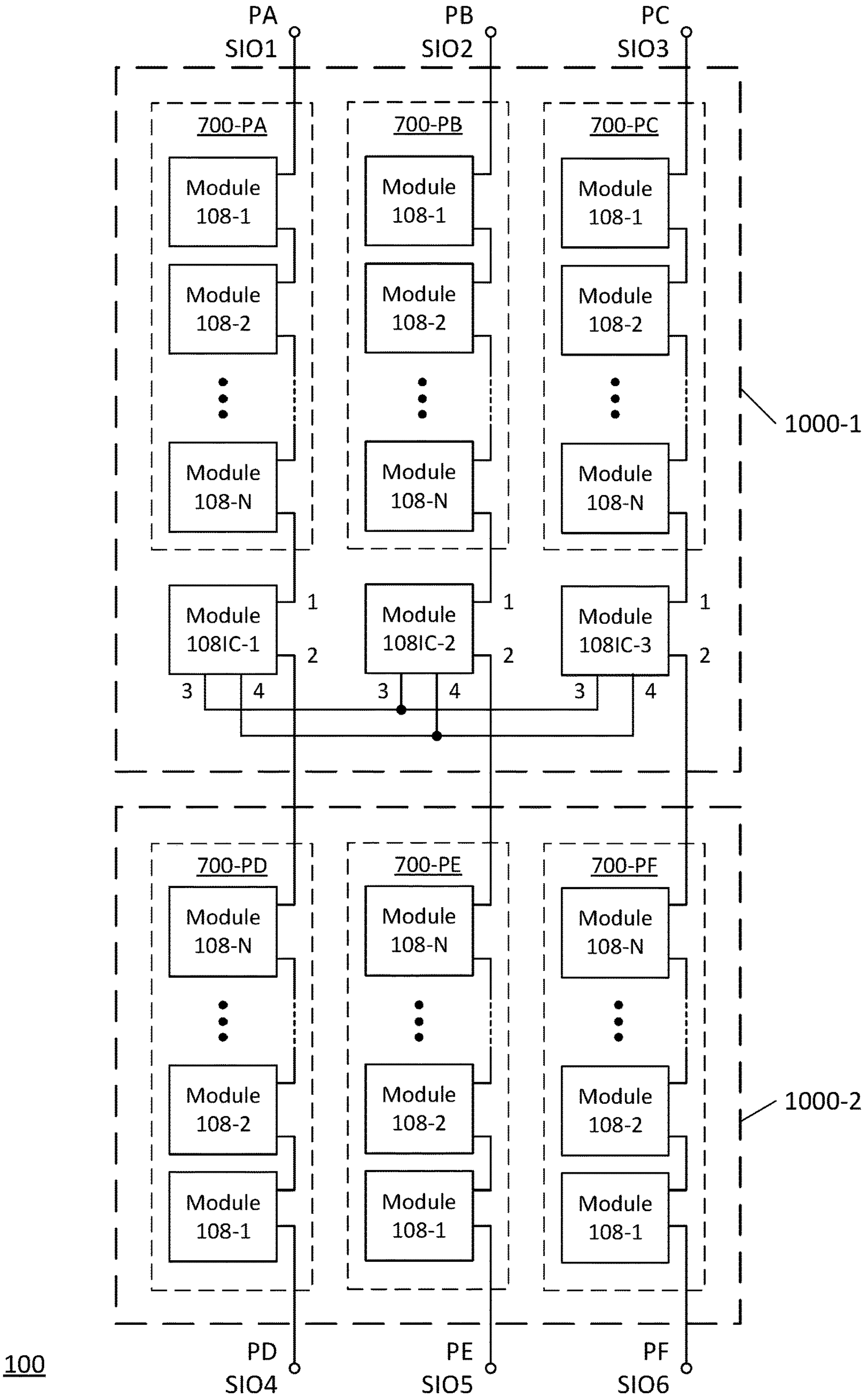
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., inter-pack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to share energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
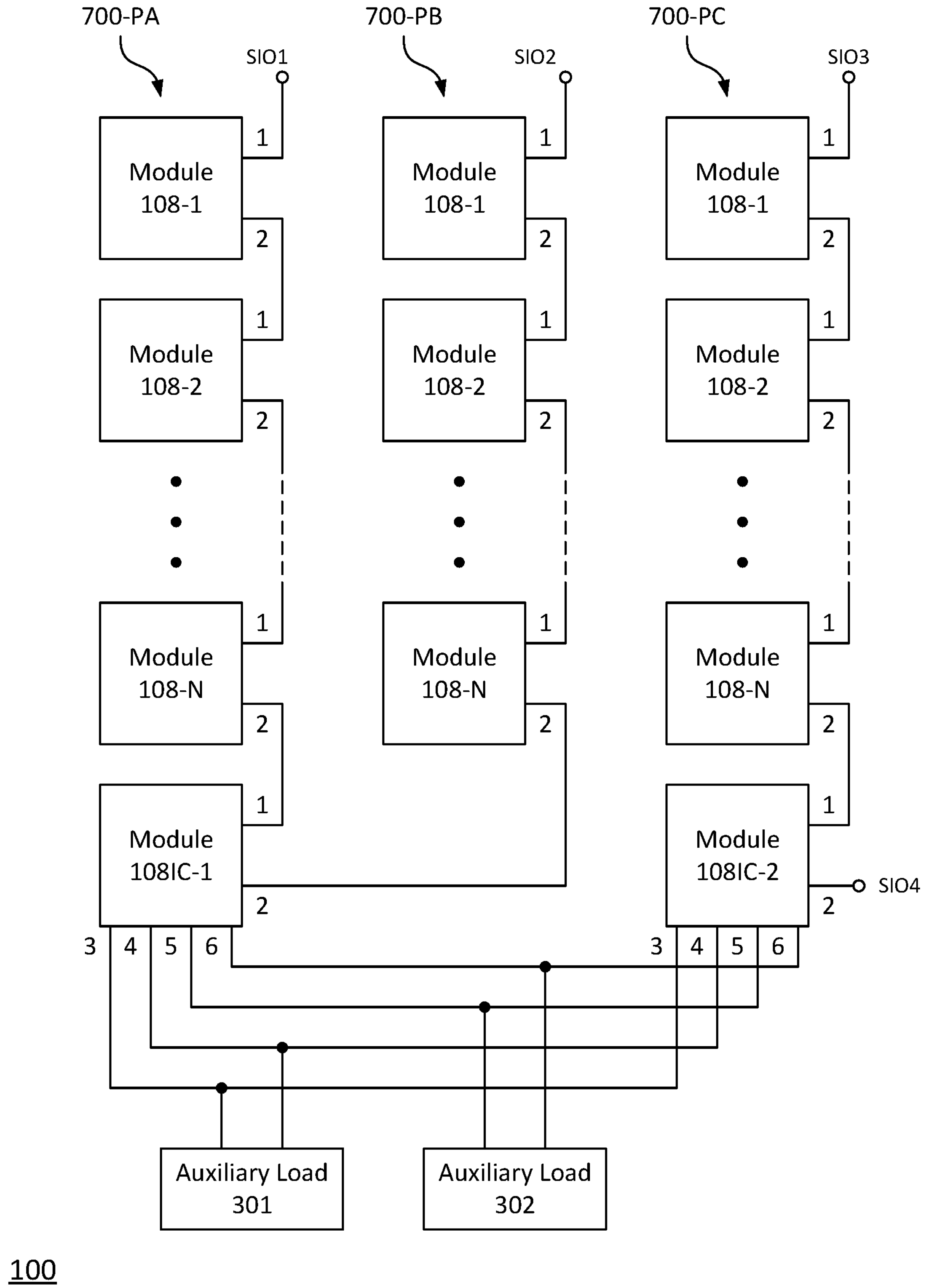
FIG. 10D is a block diagram depicting an example embodiment of a three-phase modular energy system having interconnection modules supplying auxiliary loads.
Figure 10E:
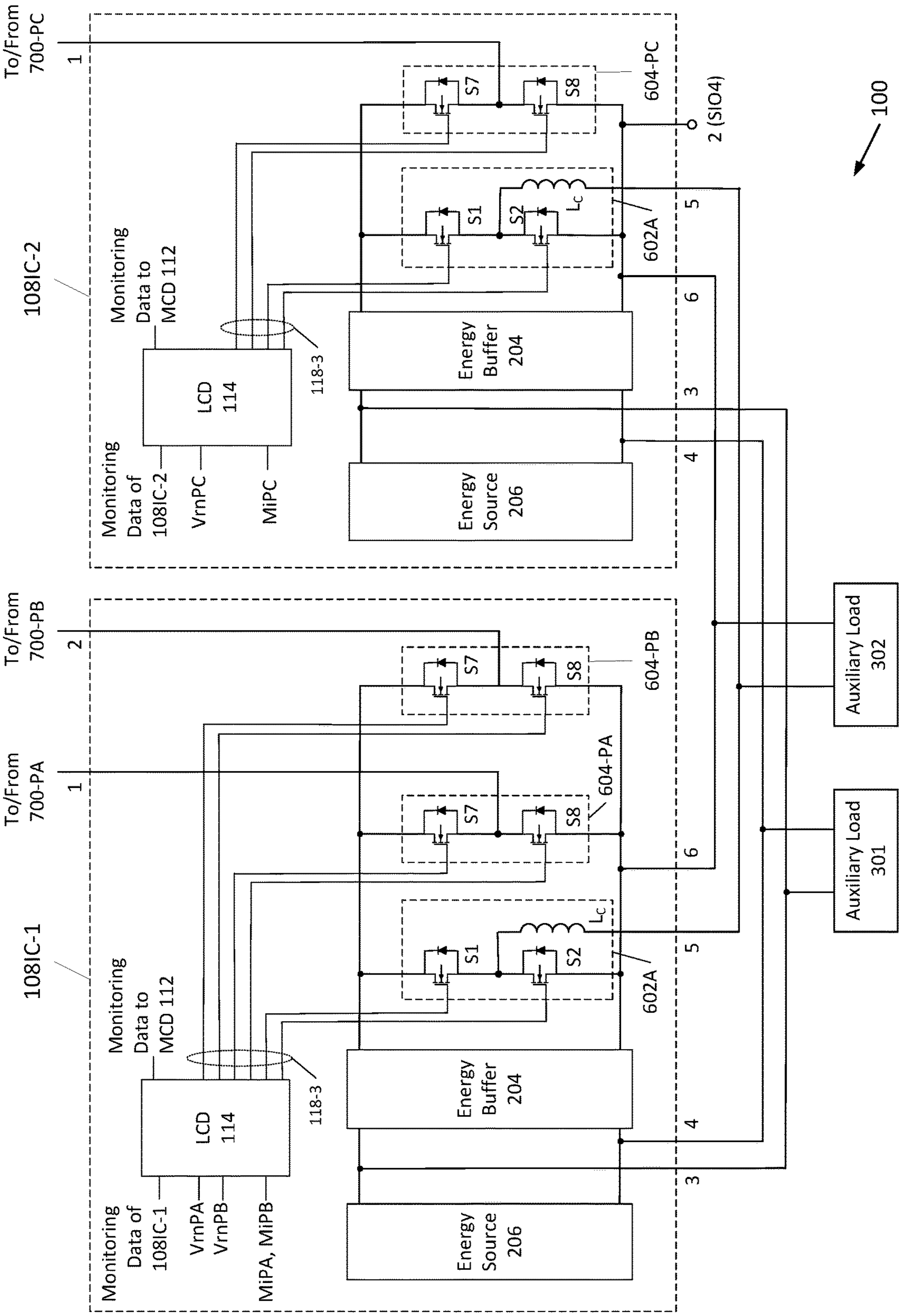
FIG. 10E is a schematic view depicting an example embodiment of the interconnection modules in the multi-phase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100 A with two modules 108IC connected to perform interphase balancing and to supply auxiliary loads 301 and 302. FIG. 10E is a schematic diagram depicting this example embodiment of system 100 with emphasis on modules 108IC-1 and 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

Figure 10F:
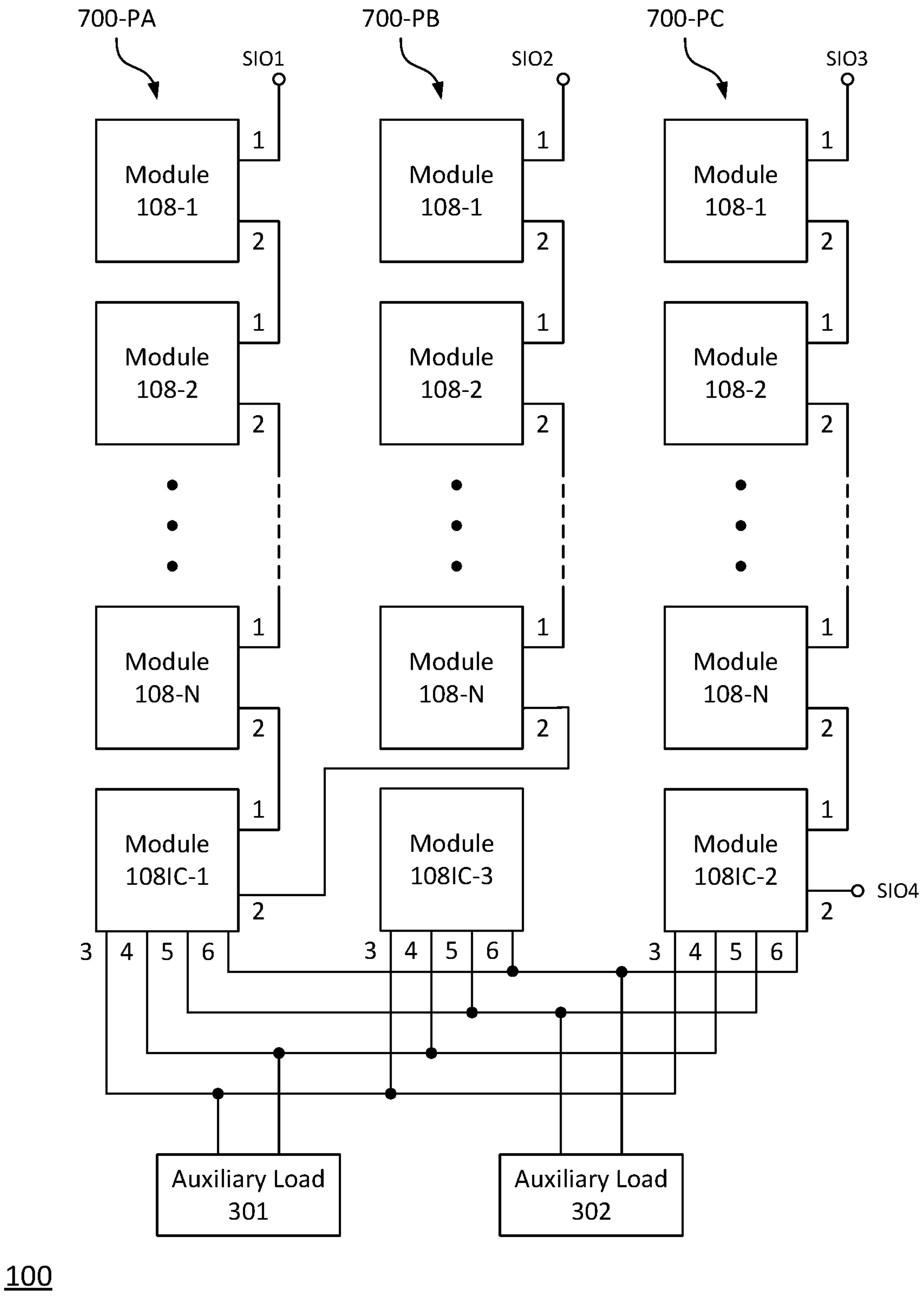
FIG. 10F is a block diagram depicting another example embodiment of a three-phase modular energy system having interconnection modules supplying auxiliary loads.

FIG. 10F is a block diagram depicting another example embodiment of a three-phase system configured to supply power to one or more auxiliary loads 301 and 302 with modules 108IC-1, 108IC-2, and 108IC-3. In this embodiment, modules 108IC-1 and 108IC-2 are configured in the same manner as described with respect to FIGS. 10D-10E. Module 108IC-3 is configured in a purely auxiliary role and does not actively inject voltage or current into any array 700 of system 100. In this embodiment, module 108IC-3 can be configured like module 108C of FIG. 3B, having a converter 202B,C (FIGS. 6B-6C) with one or more auxiliary switch portions 602A, but omitting switch portion 601. As such, the one or more energy sources 206 of module 108IC-3 are interconnected in parallel with those of modules 108IC-1 and 108IC-2, and thus this embodiment of system 100 is configured with additional energy for supplying auxiliary loads 301 and 302, and for maintaining charge on the sources 206A of modules 108IC-1 and 108IC-2 through the parallel connection with the source 206 of module 108IC-3.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Example Embodiments of Reconfigurable Arrays

System 100 can be configured to accept power from a DC source and output power to an AC charge sink (load or grid). Conversely, system 100 can be configured to accept power from an AC source and output power to a DC charge sink. Such capability can be obtained through reconfiguration of arrays 700 using additional switches. There are numerous applications for this capability, such as when using system 100 as an energy buffer for transferring energy from an AC or DC charge source to a charge sink of the opposite type (DC or AC). Various applications will be discussed further herein.

Figure 11A:
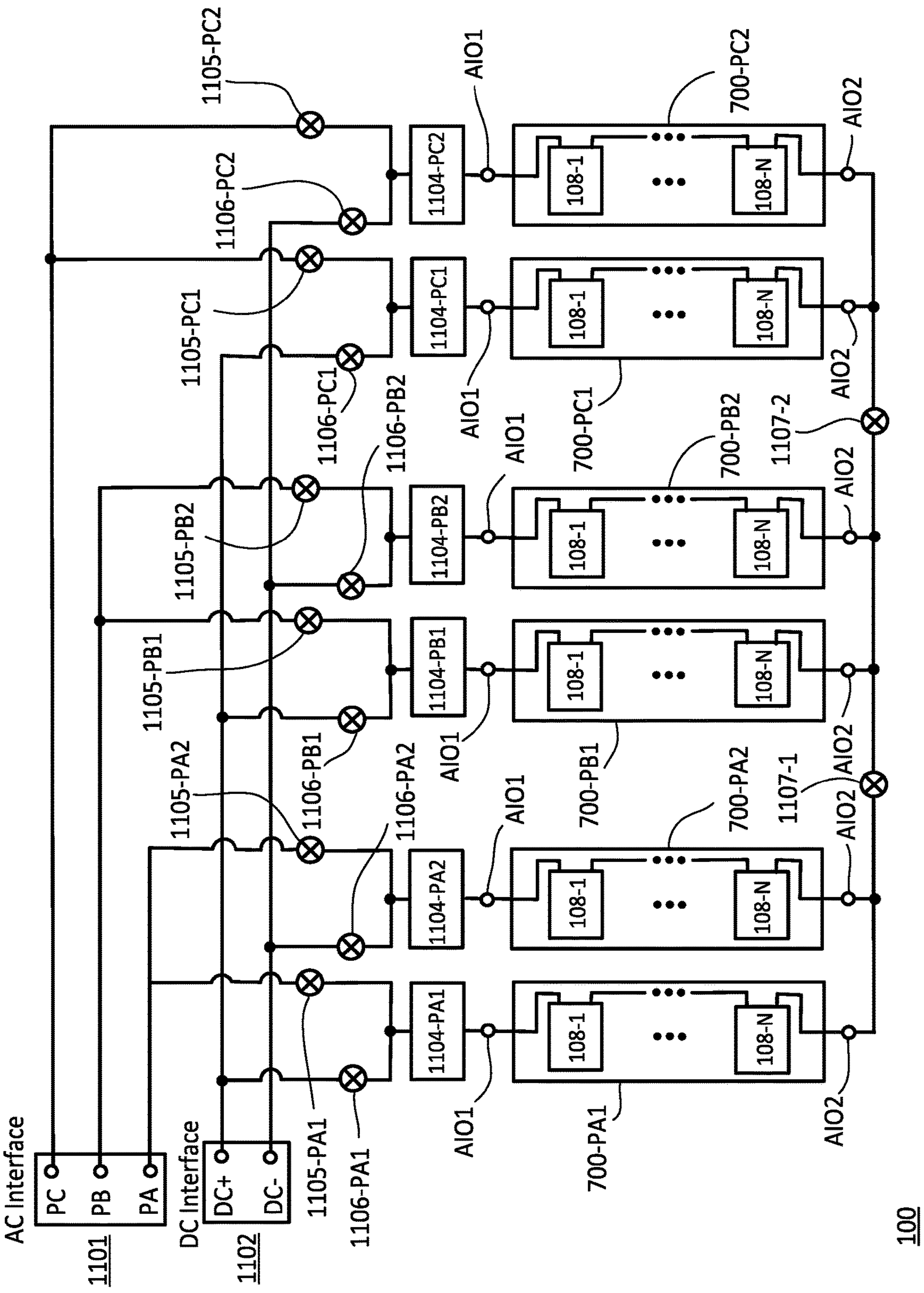
FIG. 11A is a schematic diagram depicting an example embodiment of an energy storage system.

FIG. 11A is a schematic diagram depicting an example embodiment of system 100 configured to interface with both an AC entity 1101 and a DC entity 1102. The entities 1101 and 1102 can be a grid or load depending on the application. System 100 can be configured to accept power from either the AC entity 1101 or the DC entity 1102 and output power to either the AC entity 1101 or the DC entity 1102. Here, system 100 includes six arrays 700-PA1, 700-PA2, 700-PB1, 700-PB2, 700-PC1, and 700-PC2. Each array 700 can include any number of two or more modules 108. Each array 700 has a first array input/output (AIO1) connected to module 108-1 and a second array input/output (AIO2) connected to module 108-N. AIO1 is connected to coupling circuitry 1104 (which can also be configured as a module similar to modules 108), which can include one or more voltage and/or current sensors for measuring the voltage and/or current produced by the respective array 700. For example, AIO1 of array 700-PA1 is connected to coupling circuitry 1104-PA1. Coupling circuitry 1104 can also include one or more inductors and/or capacitors for conditioning the signal produced by the respective array, and/or also one or more safety disconnects such as a circuit breaker or fuse. The one or more inductors and/or capacitors can be bypassed depending on the type of signal being received or output from each array (AC or DC).

Coupling circuitry 1104 of each array 700 is in turn coupled with a first switch 1105 that can selectively connect the respective array 700 to one of the AC lines (e.g., PA, PB, or PC). Coupling circuitry 1104 is also coupled with a second switch 1106 that can selectively connect the respective array 700 to one of the DC lines (DC+ or DC−). For example, coupling circuitry 1104-PA1 is coupled with first switch 1105-PA1 that can selectively connect array 700-PA1 to AC line PA and also coupled with second switch 1106-PA1 that can selectively connect array 700-PA to DC line DC−. Each pair of arrays assigned to a particular phase (e.g., arrays 700-PA1 and 700-PA2) can have their AIO2 nodes connected together. AIO2 nodes of adjacent array pairs can be separated by a switch 1107. Here, the array pair for phase A is separated from the array pair for phase B by switch 1107-1, and the array pair for phase B is separated from the array pair for phase C by switch 1107-2.

Figure 11B:
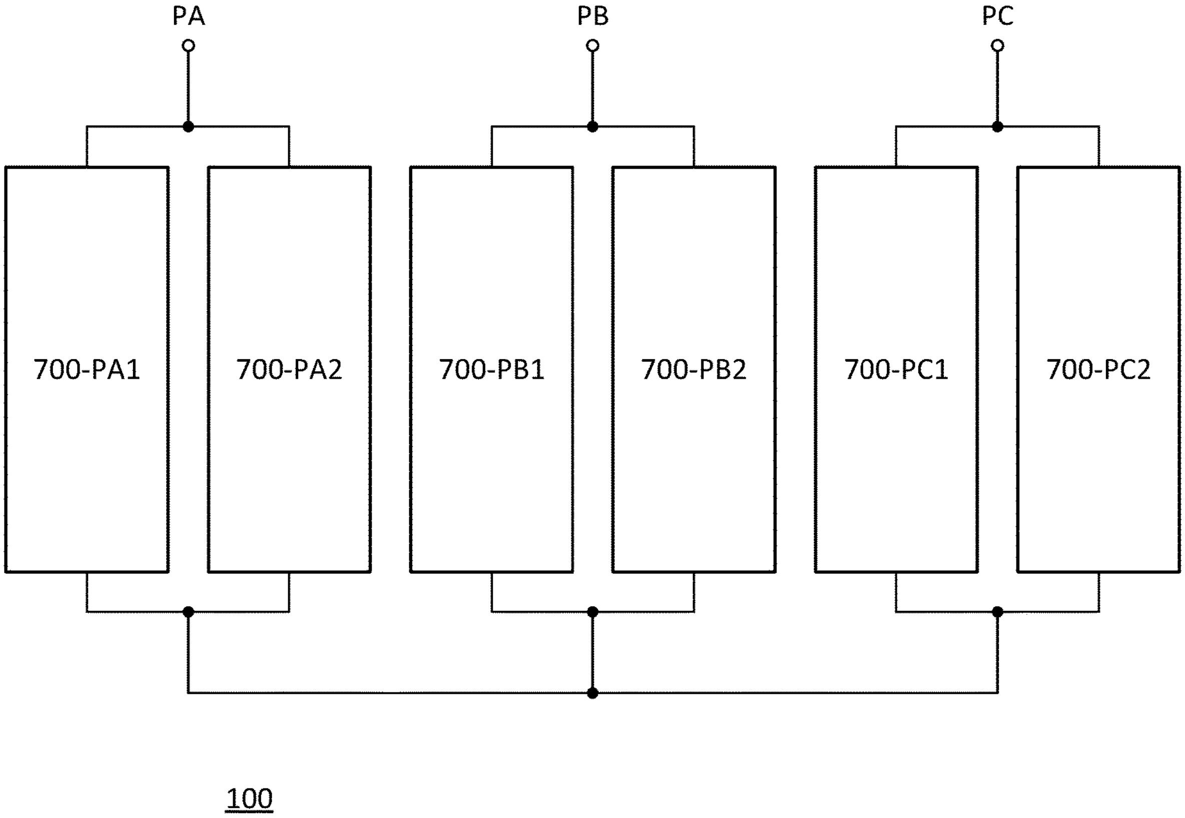
FIGS. 11B-11C are electrical equivalent diagrams depicting example embodiments of the energy storage system.

Each of switches 1105, 1106, and 1107 can be controlled by control system 102 (control connections not shown). To place system 100 in a configuration to receive power from AC entity 1101, or to generate and output power to AC entity 1101, control system 102 outputs control signals to switches 1105, 1106, and 1107 to place them in the appropriate states (open or closed). Switches 1105-PA1, 1105-PA2, 1105-PB1, 1105-PB2, 1105-PC1, and 1105-PC2 are placed in a closed state connecting the arrays 700 to the AC lines PA, PB, and PC. Control system 102 outputs control signals to switches 1106-PA1, 1106-PA2, 1106-PB1, 1106-PB2, 1106-PC1, and 1106-PC2 to place them in an open state disconnecting the arrays 700 from DC lines DC+ and DC−. Control system 102 can output a control signal to switches 1107-1 and 1107-2 to place them in closed states connecting the AIO2 nodes of the six arrays 700. FIG. 11B is an electrical equivalent diagram depicting this embodiment of system 100 in the configuration for interfacing with AC entity 1101. As can be seen here, arrays 700-PA1 and 700-PA2 are in parallel and connected to line PA, arrays 700-PB1 and 700-PB2 are in parallel and connected to line PB, and arrays 700-PC1 and 700-PC2 are in parallel and connected to line PC.

To place system 100 in a configuration to receive power from DC entity 1102, or to generate and output power to DC entity 1102, control system 102 outputs control signals to switches 1105-PA1, 1105-PA2, 1105-PB1, 1105-PB2, 1105-PC1, and 1105-PC2 to place them in an open state disconnecting the arrays 700 from the AC lines PA, PB, and PC. Control system 102 outputs control signals to switches 1106-PA1, 1106-PA2, 1106-PB1, 1106-PB2, 1106-PC1, and 1106-PC2 to place them in a closed state connecting arrays 700-PA1, 700-PB1, and 700-PC1 to line DC+ and connecting arrays 700-PA2, 700-PB2, and 700-PC2 to line DC−. Control system 102 can output a control signal to switches 1107-1 and 1107-2 to place them in open states disconnecting the AIO2 nodes of adjacent array pairs.

Figure 11C:
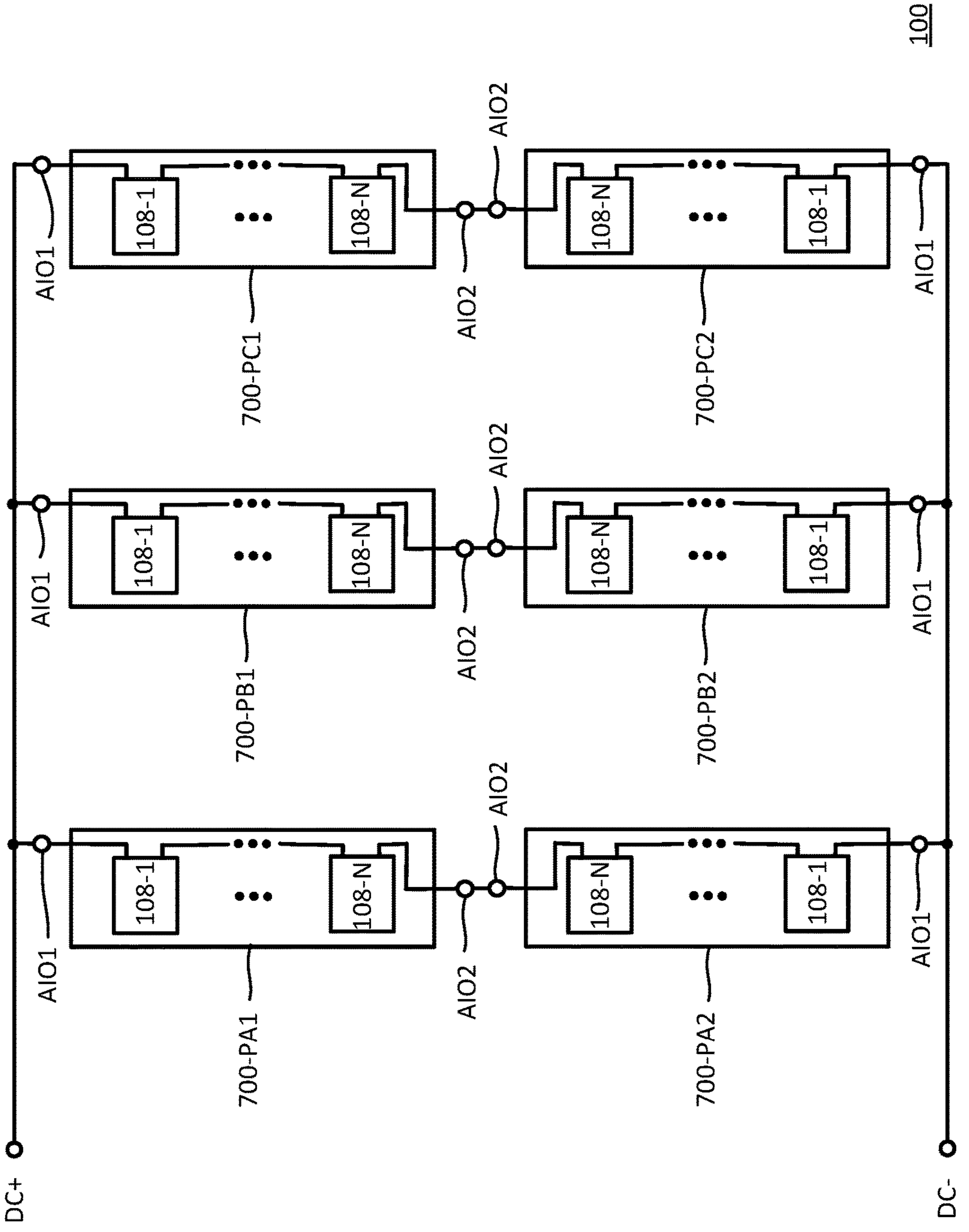

FIG. 11C is an electrical equivalent diagram depicting this embodiment of system 100 in the configuration for interfacing with DC entity 1102. As can be seen here, arrays 700-PA1 and 700-PA2 are in series, with AIO1 of array 700-PA1 connected to line DC+, AIO2 of array 700-PA1 connected to AIO2 of array 700-PA2, and AIO1 of array 700-PA2 connected to line DC−. Thus, array 700-PA2 is inverted and converter 202 states of the modules of array 700-PA2 that would have produced a positive voltage when in the AC configuration of FIG. 11B, now produce a negative voltage in this DC configuration. Control system 102 is configured to reverse switching signal generation for the converters of array 700-PA2 to accommodate this inverted arrangement. The other array pairs (700-PB1, PB2 and 700-PC1, PC2) are configured similarly to arrays 700-PA1 and PA2. By placement of the arrays in series, the DC configuration of FIG. 11C can produce a positive voltage twice that of the AC configuration of FIG. 11B. System 100, under control of control system 102 can individually control converter 202 of each of modules 108 to produce a DC output voltage that is any multiple of the energy source voltages of the modules. For example, if the modules 108 each include a 50V energy source, and there are ten modules in an array 700, then system 100 can produce (and receive) any DC voltage between 50 V and 1000V at 50V steps. This highly dynamic capability allows system 100 to charge from and discharge to a wide variety of different DC entities 1102.

Figure 12A:
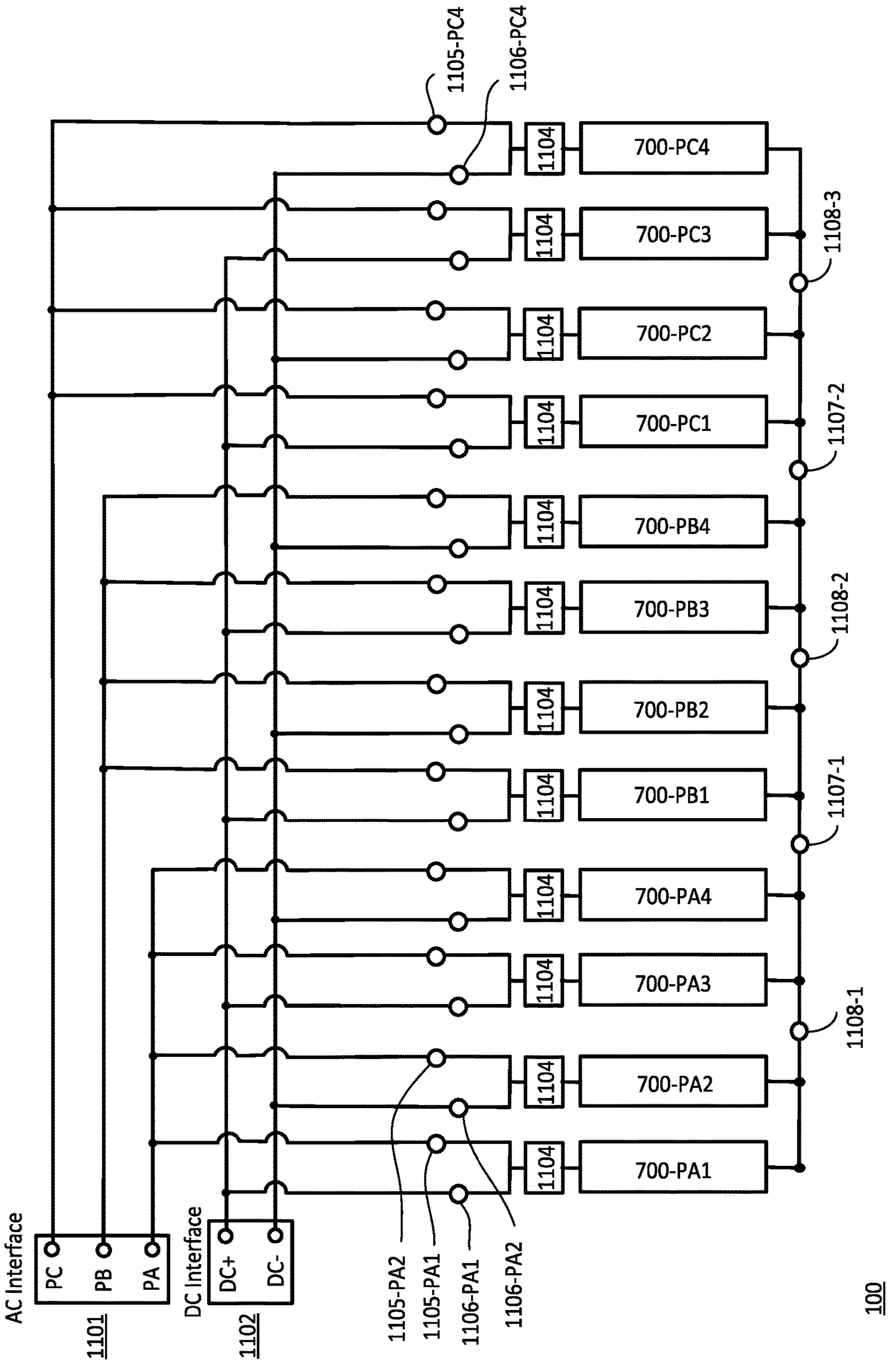
FIG. 12A is a schematic diagram depicting an example embodiment of an energy storage system.

System 100 can be expanded to more complex configurations with greater energy storing capacity. FIG. 12A is a schematic diagram depicting another example embodiment of system 100 having greater capacity and greater current generating capability. In this embodiment, system 100 includes 12 arrays 700, each of which is configured similar to those of the embodiment of FIG. 11A. A difference is that each array pair for a particular AC phase is in parallel with another array pair for that phase. Arrays 700-PA1 and 700-PA2 are in parallel with arrays 700-PA3 and 700-PA4, arrays 700-PB1 and 700-PB2 are in parallel with arrays 700-PB3 and 700-PB4, and arrays 700-PC1 and 700-PC2 are in parallel with arrays 700-PC3 and 700-PC4. An additional set of switches 1108 are present between the AIO2 nodes of adjacent pairs assigned to a given phase. Switch 1108-1 is present between the AIO2 nodes of arrays 700-PA1, PA2 and the AIO2 nodes of arrays 700-PA3, PA4. Switch 1108-2 is present between the AIO2 nodes of arrays 700-PB1, PB2 and the AIO2 nodes of arrays 700-PB3, PB4. Switch 1108-3 is present between the AIO2 nodes of arrays 700-PC1, PC2 and the AIO2 nodes of arrays 700-PC3, PC4.

Figure 12B:
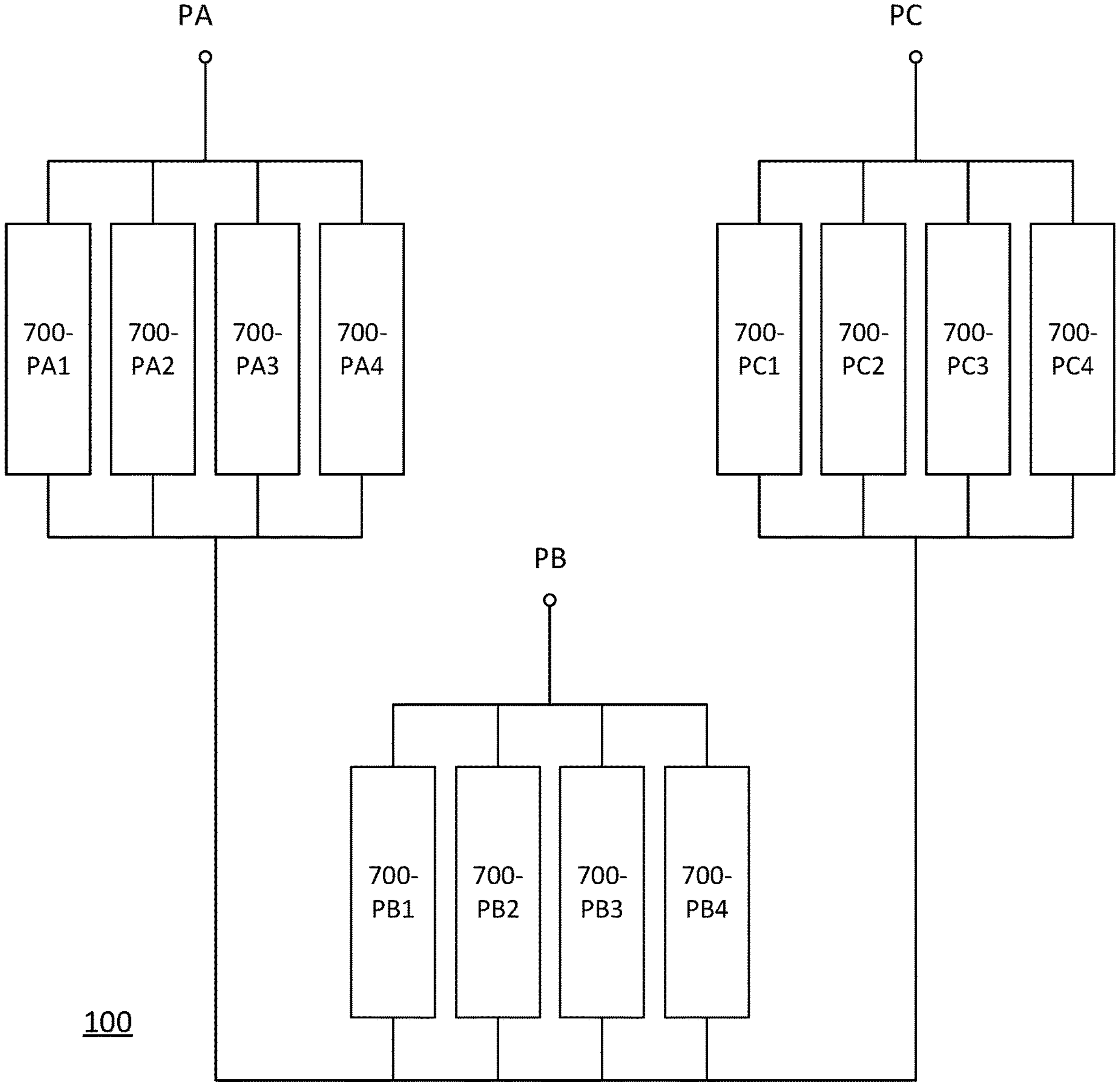
FIGS. 12B-12C are electrical equivalent diagrams depicting example embodiments of the energy storage system.

To place system 100 in a configuration to receive power from AC entity 1101, or to generate and output power to AC entity 1101, control system 102 outputs control signals to switches 1105 to place them in a closed state connecting the arrays 700 to the AC lines PA, PB, and PC. Control system 102 outputs control signals to switches 1106 to place them in an open state disconnecting the arrays 700 from DC lines DC+ and DC−. Control system 102 can output a control signal to switches 1107 and 1108 to place them in closed states connecting the AIO2 nodes of the twelve arrays 700. FIG. 12B is an electrical equivalent diagram depicting this embodiment of system 100 in the configuration for interfacing with AC entity 1101. As can be seen here, arrays 700-PA1, PA2, PA3, and PA4 are in parallel and connected to line PA, arrays 700-PB1, PB2, PB3, and PB4 are in parallel and connected to line PB, and arrays 700-PC1, PC2, PC3, and PC4 are in parallel and connected to line PC.

To place system 100 in a configuration to receive power from DC entity 1102, or to generate and output power to DC entity 1102, control system 102 outputs control signals to switches 1105 to place them in an open state disconnecting the arrays 700 from the AC lines PA, PB, and PC. Control system 102 outputs control signals to switches 1106 to place them in a closed state connecting arrays 700-PA1, 700-PA3, 700-PB1, 700-PB3, 700-PC1, and 700-PC3 to line DC+ and connecting arrays 700-PA2, 700-PA4, 700-PB2, 700-PB4, 700-PC2, and 700-PC4 to line DC−. Control system 102 can output a control signal to switches 1107-1 and 1107-2 to place them in open states disconnecting the AIO2 nodes between different phase groups A, B, and C, and can also output a control signal to switches 1108-1, 1108-2, and 1108-3 to place them in open states disconnecting the AIO2 nodes between different array pairs within the same phase group A, B, and C.

Figure 12C:
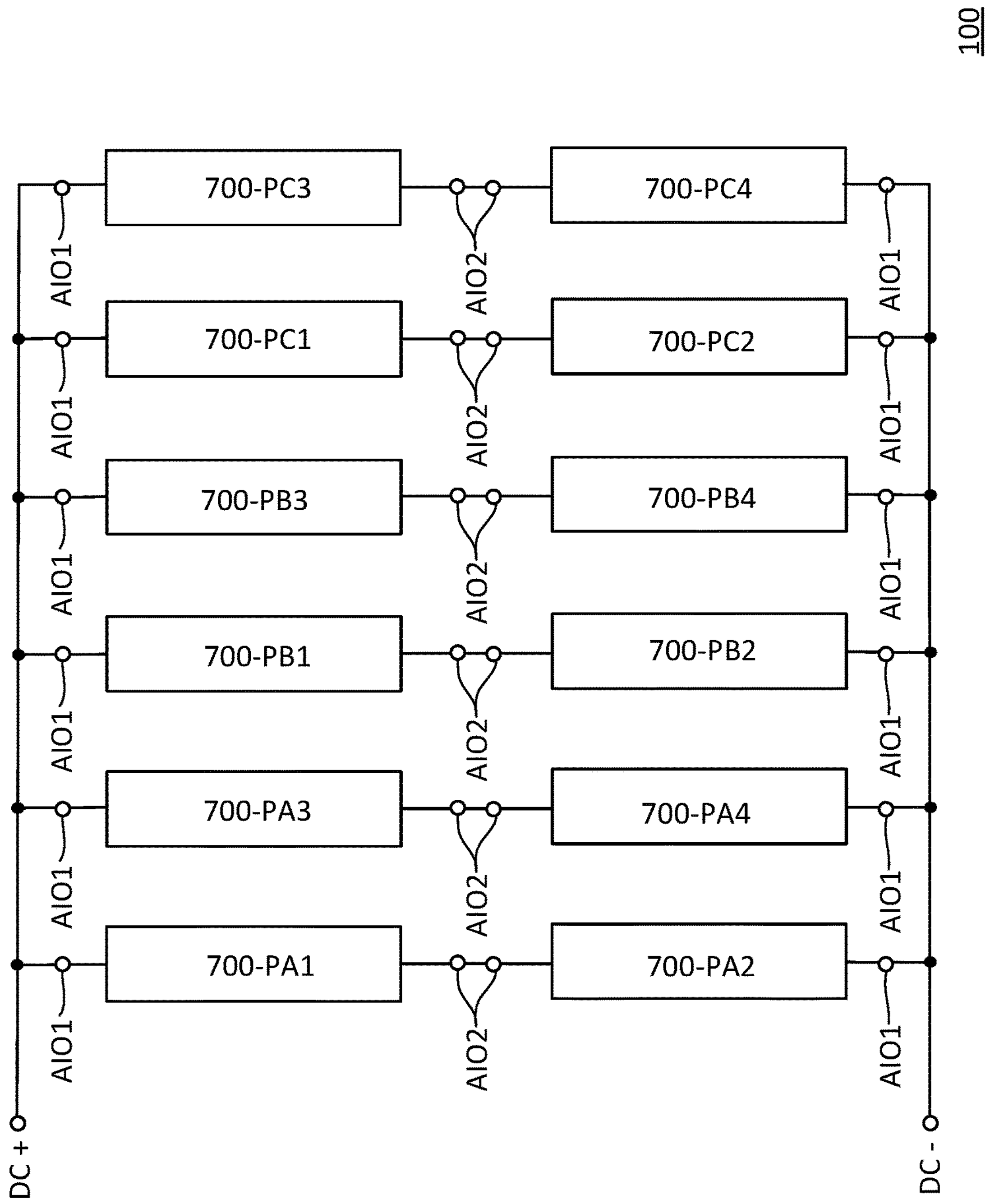

FIG. 12C is an electrical equivalent diagram depicting this embodiment of system 100 in the configuration for interfacing with DC entity 1102. This configuration is the same as that of FIG. 11C, but with arrays 700-PA3 and PA4 connected in series like arrays 700-PA1 and PA2. Thus two serial strings are present, one composed of arrays 700-PA1 and PA2, and another composed of arrays 700-PA3 and PA4. These two series strings are connected in parallel. The arrays 700 of the other phase groups B and C are similarly configured such that all of the strings are in parallel. The doubling of the number of arrays in this manner doubles the capacity and current generating capability in both the AC and DC configurations.

In the embodiments of FIGS. 11A-12C, instead of using a control signal to place any of switches 1105, 1106, 1107, and 1108 in a disconnected state, those switches can be configured to default to a disconnected state automatically for safety. Further, switches 1107 and 1108 can be omitted if desired. The number of switches 1106 can be consolidated and reduced in both embodiments of FIGS. 11A and 12A, and the number of switches 1105 can be consolidated and reduced in the embodiment of FIG. 12A. A high-voltage transformer can be placed between the AC entity 1101 and system 100 in order to provide voltage compatibility and galvanic isolation for system 100 from the AC entity 1101.

Example Applications for Reconfigurable Arrays

The reconfigurable array embodiments of FIGS. 11A-12C can be used in a variety of applications where power is transferred from one of an AC or DC entity to another of an AC or DC entity. One such application is an energy buffer that can receive output from a first energy source in a DC format, such as a renewable energy source like a photovoltaic panel, store that energy within system 100, and then output that energy to a load or grid in the form of an AC entity. Another such application is the reverse, where energy is received from an AC source such as a grid, stored in system 100, and then output to a DC entity such as a conventional battery pack or DC grid.

These embodiments are suitable for a charge station that can accept power from an AC grid and store that power within the modules of system 100, and then output that power as a DC charge signal for one or more electric vehicles (EVs). The DC voltage can be output from system 100 to a DC charge tower (the DC entity 1102), which in turn can interface directly with the EV itself (the energy storage system thereof). The DC charge tower can include a DC-DC converter if necessary although such is not required given the dynamic voltage production capability of system 100.

The charge station can be stationary and permanently installed at a particular location like a restaurant, office place, gas station, and the like. Alternatively, the charge station can be mobile and transported from a location where AC (or DC) power is available for charging system 100, to a second location where the stored energy is required in the same or different format but does not have the requisite AC (or DC) power source.

Figure 13A:
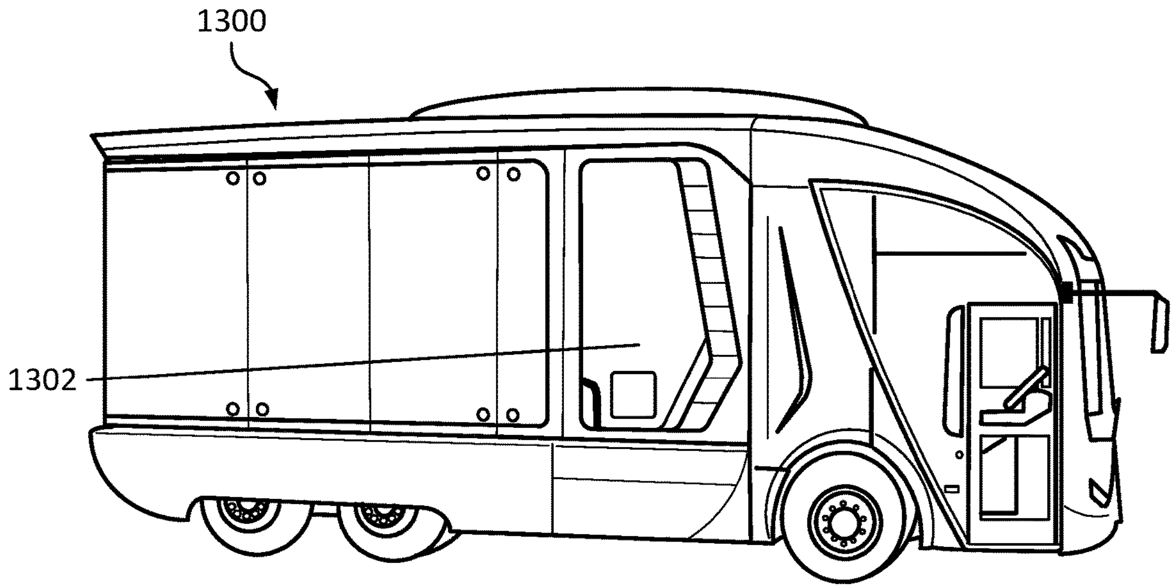
FIGS. 13A-13C are perspective views depicting an example embodiment of a mobile charge station.
Figure 13B:
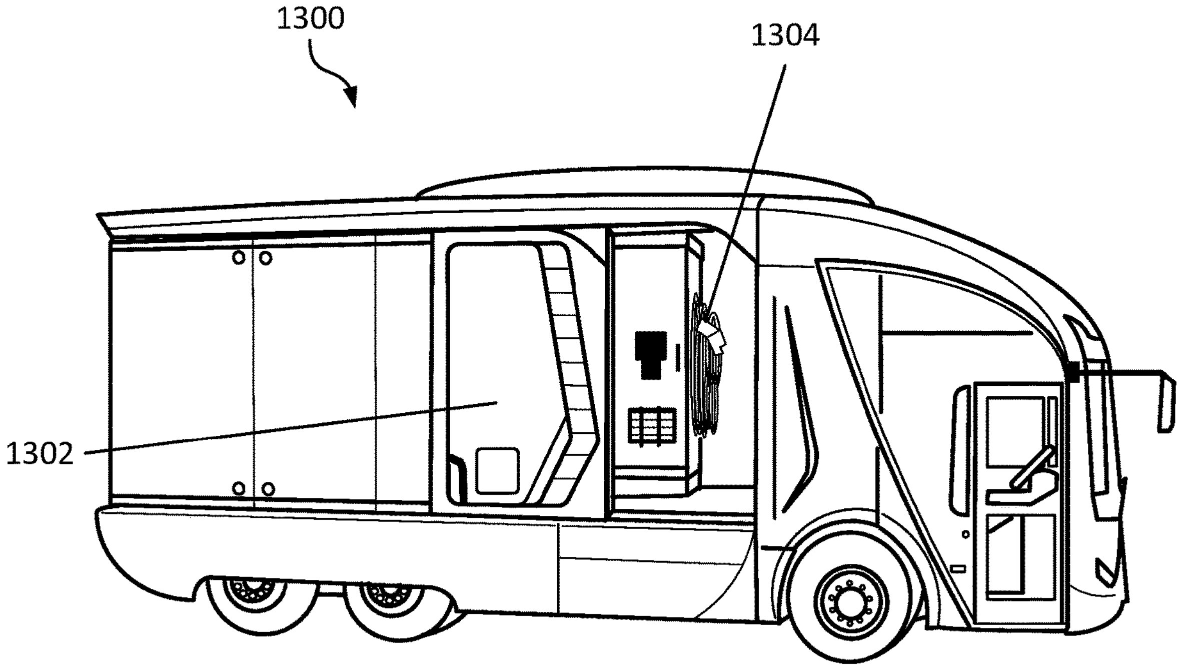
Figure 13C:
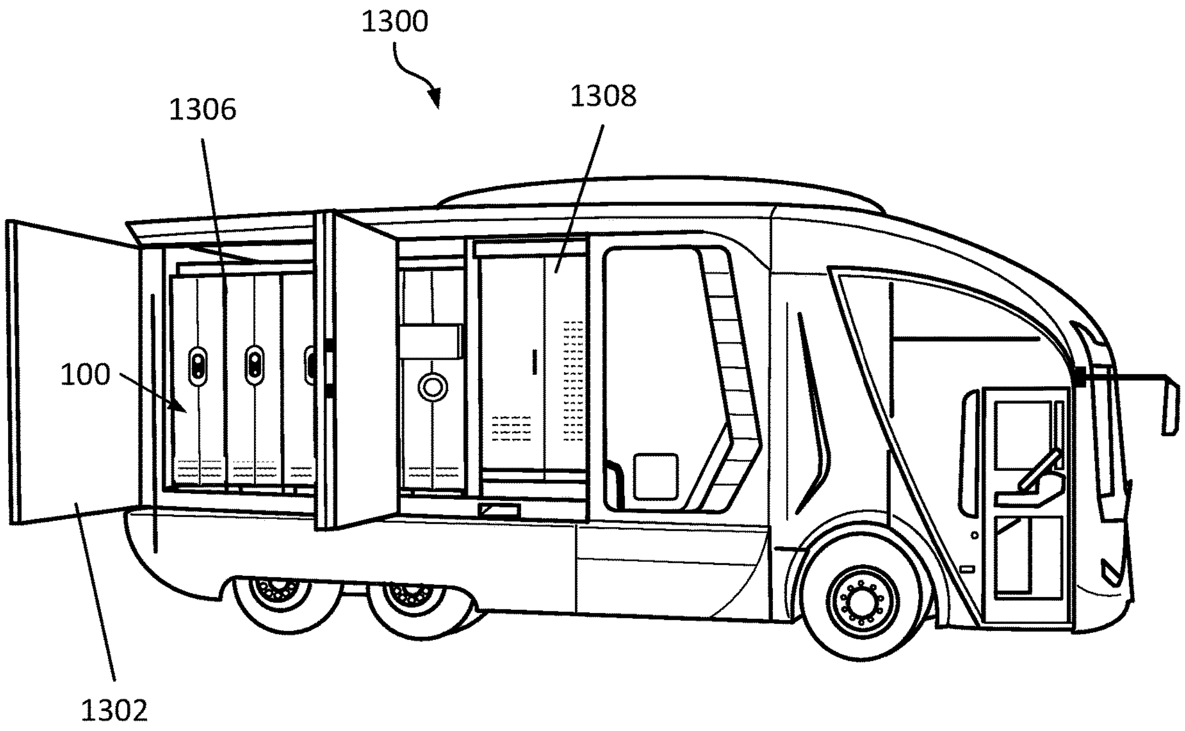

FIGS. 13A-13C are perspective views depicting an example embodiment of a mobile charge station (or mobile charger) 1300. In this embodiment, mobile charge station 1300 is configured as a large bus, yet any movable vehicular arrangement can be used, such as a flatbed truck having system 100 thereon, or a semi-truck towing a container housing system 100. The container can then be deposited at the alternative location or energy system 100 can be utilized while on or in the truck.

Mobile charger 1300 has an embodiment of system 100 configured like that of, or similar to, the embodiments of FIGS. 11A and 12A. In this embodiment, mobile charger 1300 is configured to interface with AC entity 1101 in the form of a three-phase power grid to charge the modules of system 100, and in turn to discharge those modules to a DC entity 1102 such as an electric vehicle (EV) in need of charging. In some embodiments, mobile charger 1300 can be configured to interface with DC entity 1102, e.g., in the form of a renewable energy source like a photovoltaic panel, and in turn discharge those modules to a DC entity 1102 in need of charging. Mobile charger 1300 can also be configured to discharge modules to an AC entity 1101.

Mobile charger 1300 has movable doors 1302 that can be opened to expose one or more DC charging interfaces (e.g., a charge tower) 1304 therein (FIG. 13B). Charging interface 1304 can be configured, as shown here, with a charge cable for charging the EV (not shown). Mobile charger 1300 can also include system 100 arranged in multiple racks or cabinets 1306 (FIG. 13C), each housing one or more arrays 700 as well as coupling circuitry 1104 for those arrays. A cabinet 1108 can contain terminals for interfacing with AC entity 1101 (or for interfacing with DC entity 1102 in implementations in which modules are charged by DC entity 1102).

System 100 can be connected to the AC entity 1101 (via terminals within cabinet 1108) and the energy sources 206 of system 100 can be fully charged by that AC entity 1101. Mobile charger 1300 can then be transported to a location for charging one or more EVs with charging interface 1304. The alternative location can be, for example, a parking lot at a sporting event or other gathering or location where available EV charging resources are limited. System 100 can be configured to charge two or more EVs simultaneously by control of modules 108. The capacity of system 100 is readily expandable or contractable by adding or removing arrays 700, or modules 108 within the arrays 700. Thus, mobile charger 1300 can be readily reconfigured depending on the anticipated energy requirements at the EV charging location. For example, arrays 700 and/or modules 108 can be added to or removed from the racks or cabinets 1306 depending on the anticipated energy requirements.

Example Embodiments of Processes for Reconfiguring Arrays

Figure 14:
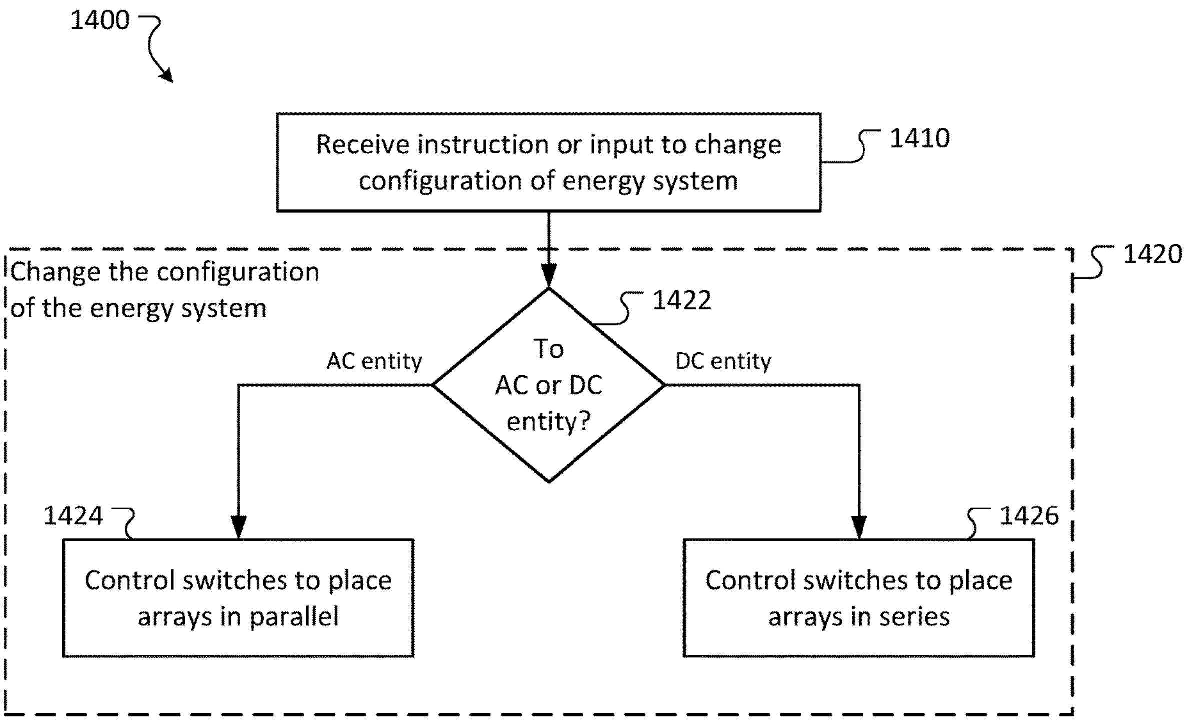
FIG. 14 is a flow diagram depicting an example embodiment of a method of changing a configuration of an energy system.

FIG. 14 is a flow diagram depicting an example embodiment of a method 1400 of changing a configuration of an energy system 100. The method 1400 can be performed by control system 102.

At step 1410, control system 102 receives an instruction or input to change the configuration of energy system 100. As described herein, system 100 can be placed in a configuration to receive power from AC entity 1101, or to generate and output power to AC entity 1101. System 100 can also be placed in a configuration to receive power from DC entity 1102, or to generate and output power to DC entity 1102.

System 100 can have a first configuration in which energy system 100 is configured to receive power from or output power to a first entity. The first entity can be either DC entity 1102 or AC entity 1101. System 100 can have a second configuration in which system 100 is configured to receive power from or output power to a second entity. The second entity can be the other of DC entity 1102 or AC entity 1101. For example, if the first entity is DC entity 1102, the second entity is AC entity 1101. Similarly, if the first entity is AC entity 1101, the second entity is DC entity 1102.

The instruction or input to change system configuration can be generated internally by control system 102, for example, according to the occurrence of an event such as a scheduled event or a system sensed event (e.g., a sensed connection to or disconnection from an AC or DC charge source. In such embodiments the instruction or input can be generated by one segment, module, or routine of control system 102 responsible for event detection or management and communicated to (and received by) another with responsibility for implementing the instruction or input. The instruction or input can also be received from an external control device 104. In some embodiments, such as those described with reference to FIGS. 13A-13C, external control device 104 can be a vehicular ECU or a local interface of a vehicle. The instruction or input can be received from a human operator indirectly through a system actuator or system interface (e.g., a switch, button, or graphical use interface implemented on a touchscreen). Whether external or internal, the local interface can be a human machine interface (HMI), e.g., a graphical user interface (GUI), coupled to control system 102. An operator can change the configuration energy system 100 using the interface. For example, after charging energy sources 206 of modules 108 of arrays 700 using an AC source (e.g., grid), the operator can change the configuration of system 100 to connect to an EV to charge the EV. In this example, control system 102 receives an input to change system 100 from a configuration in which system 100 is configured to receive power from or output power to AC entity 1101 to a configuration in which system 100 is configured to receive power from or output power to DC entity 1102.

At step 1420, control system 102 changes the configuration of system 100. Control system 102 can change the configuration in response to receiving the instruction or input and/or based on the instruction or input. Control system 102 can change the configuration of system 100 by outputting control signals to switches of system 100. In this example, control system 102 performs constituent step 1422 and either step 1424 or step 1426 to change the configuration of system 100.

At step 1422, control system 102 identifies the configuration to which system 100 is being changed. Control system 102 can determine the configuration based on the received instruction or input. Control system 102 can determine whether the configuration is the configuration for receiving power from or outputting power to DC entity 1102 or the configuration for receiving power from or outputting power to AC entity 1101. If the configuration is for AC entity 1101, control system 1102 performs step 1424. If the configuration is for DC entity 1102, control system 1102 performs step 1426.

In step 1424, control system 102 outputs control signals to switches to place arrays 700 of system 100 in parallel. In the example embodiment shown in FIG. 11A, control system can output control signals that place switches 1105-PA1, 1105-PA2, 1105-PB1, 1105-PB2, 1105-PC1, and 1105-PC2 in a closed state connecting the arrays 700 to the AC lines PA, PB, and PC. Control system 102 can also output control signals to switches 1106-PA1, 1106-PA2, 1106-PB1, 1106-PB2, 1106-PC1, and 1106-PC2 to place them in an open state disconnecting the arrays 700 from DC lines DC+ and DC−. Control system 102 can also output a control signal to switches 1107-1 and 1107-2 to place them in closed states connecting the AIO2 nodes of the six arrays 700. This switch configuration places array 700-PA1 in parallel with 700-PA2, array 700-PB1 in parallel with array 700-PB2, and array 700-PC1 in parallel with array 700-PC2, as shown in FIG. 11B.

In the example embodiment of FIG. 12A, control system 102 outputs control signals to switches 1105 to place them in a closed state connecting the arrays 700 to the AC lines PA, PB, and PC. Control system 102 can also output control signals to switches 1106 to place them in an open state disconnecting the arrays 700 from DC lines DC+ and DC−. Control system 102 can also output a control signal to switches 1107 and 1108 to place them in closed states connecting the AIO2 nodes of the twelve arrays 700. This switch configuration places arrays 700-PA1, PA2, PA3 and PA4 in parallel, arrays 700-PB1, PB2, PB3 and PB4 in parallel, and arrays 700-PC1, PC2, PC3 and PC4 in parallel, as shown in FIG. 12B.

In step 1426, control system 102 outputs signals to switches to place arrays 700 of system 100 in series. In the example embodiment shown in FIG. 11A, control system 102 outputs control signals to switches 1105-PA1, 1105-PA2, 1105-PB1, 1105-PB2, 1105-PC1, and 1105-PC2 to place them in an open state disconnecting the arrays 700 from the AC lines PA, PB, and PC. Control system 102 can also output control signals to switches 1106-PA1, 1106-PA2, 1106-PB1, 1106-PB2, 1106-PC1, and 1106-PC2 to place them in a closed state connecting arrays 700-PA1, 700-PB1, and 700-PC1 to line DC+ and connecting arrays 700-PA2, 700-PB2, and 700-PC2 to line DC−. Control system 102 can also output a control signal to switches 1107-1 and 1107-2 to place them in open states disconnecting the AIO2 nodes of adjacent array pairs. This switch configuration places array 700-PA1 in series with array 700-PA2, array 700-PB1 in series with array 700-PB2, and array 700-PC1 in series with array 700-PC2, as shown in FIG. 11C.

In the example embodiment of FIG. 12A, control system 102 outputs control signals to switches 1106 to place them in a closed state connecting arrays 700-PA1, 700-PA3, 700-PB1, 700-PB3, 700-PC1, and 700-PC3 to line DC+ and connecting arrays 700-PA2, 700-PA4, 700-PB2, 700-PB4, 700-PC2, and 700-PC4 to line DC−. Control system 102 can also output a control signal to switches 1107-1 and 1107-2 to place them in open states disconnecting the AIO2 nodes between different phase groups A, B, and C. Control system 102 can also output a control signal to switches 1108-1, 1108-2, and 1108-3 to place them in open states disconnecting the AIO2 nodes between different array pairs within the same phase group A, B, and C. This switch configuration places array 700-PA1 in series with array 700-PA2, array 700-PA3 in series with array 700-PA4, array 700-PB1 in series with array 700-PB2, array 700-PB3 in series with array 700-PB4, array 700-PC1 in series with array 700-PC2, and array 700-PC3 in series with array 700-PC4.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

In many embodiments, an energy system includes arrays. Each array includes at least two modules electrically connected together to output a cumulative voltage signal including a superposition of output voltages from each of the at least two modules. Each of the modules includes an energy source connected to a converter configured to selectively generate the output voltage from the energy source. The energy system includes switches and a control system configured to control the modules of the arrays to generate the cumulative voltage signal, and configured to control the plurality of switches such that the cumulative voltage signal is output to either a DC entity or an AC entity.

In some embodiments, the arrays include a first array and a second array connected such that the control system is configured to control the switches to place the first array and the second array in parallel to receive power from or output power to the AC entity.

In some embodiments, the control system is configured to control the switches to place the first array and the second array in series to receive power from or output power to the DC entity.

In some embodiments, the arrays include a first array, a second array, a third array, a fourth array, a fifth array, and a sixth array. The control system is configured to control the switches to connect the first array and the second array to a first line of a multiphase AC interface. The control system is configured to control the switches to connect the third array and the fourth array to a second line of a multiphase AC interface. The control system is configured to control the switches to connect the fifth array and the sixth array to a third line of a multiphase AC interface.

In some embodiments, the first array and the second array are in parallel when connected to the first line. The third array and the fourth array are in parallel when connected to the second line. The fifth array and the sixth array are in parallel when connected to the third line.

In some embodiments, the control system is configured to control the switches to connect the first array, the third array, and the fifth array to a positive line of a DC interface, and to connect the second array, the fourth array, and the sixth array to a negative line of a DC interface.

In some embodiments, when connected to the DC interface, the first array and the second array are in series to form a first string, the third array and the fourth array are in series to form a second string, and the fifth array and the sixth array are in series to form a third string, with the first, second and third strings in parallel.

In many embodiments, a mobile charge station includes a vehicle and an energy storage system configured in accordance with any of the aforementioned embodiments.

In some embodiments, the mobile charge station includes a DC charge tower and cable configured to charge an electric vehicle.

In some embodiments, the mobile charge station includes a plurality of doors configured to expose the DC charge tower and the energy storage system within the mobile charge station.

In some embodiments, the mobile charge station includes terminals for interfacing with the AC entity for charging the energy source of each module.

In some embodiments, the mobile charge station includes terminals for interfacing with a DC entity for charging the energy source of each module.

In some embodiments, the mobile charge station includes racks or cabinets in which the energy storage system is arranged.

In many embodiments, a method includes receiving, by a control system, an instruction or input to change a configuration of an energy system comprising a plurality of arrays of modules from a first configuration in which the energy system is configured to receive power from or output power to a first entity that is one of a DC entity or an AC entity and a second configuration in which the energy system is configured to receive power from or output power to a second entity that is the other of the DC entity of the AC entity and changing, by the control system, the configuration of the energy system from the first configuration to the second configuration by controlling a plurality of switches.

In some embodiments, each array includes at least two modules electrically connected together to output a cumulative voltage signal including a superposition of output voltages from each of the at least two modules. Each of the modules includes an energy source connected to a converter configured to selectively generate the output voltage from the energy source.

In some embodiments, the control system receives the input from an external control device.

In some embodiments, the plurality of arrays includes a first array and a second array. Controlling the plurality of switches includes placing the first array and the second array in parallel when the second entity is the AC entity.

In some embodiments, the plurality of arrays includes a first array and a second array. Controlling the plurality of switches includes placing the first array and the second array in series when the second entity is the DC entity.

In some embodiments, the plurality of arrays includes a first array, a second array, a third array, a fourth array, a fifth array, and a sixth array. Controlling the plurality of switches includes connecting the first array and the second array to a first line of a multiphase AC interface, connecting the third array and the fourth array to a second line of a multiphase AC interface, and connecting the fifth array and the sixth array to a third line of a multiphase AC interface.

In some embodiments, the first array and the second array are in parallel when connected to the first line. The third array and the fourth array are in parallel when connected to the second line. The fifth array and the sixth array are in parallel when connected to the third line.

In some embodiments, controlling the plurality of switches includes connecting the first array, the third array, and the fifth array to a positive line of a DC interface and connecting the second array, the fourth array, and the sixth array to a negative line of a DC interface.

In some embodiments, when connected to the DC interface, the first array and the second array are in series to form a first string, the third array and the fourth array are in series to form a second string, and the fifth array and the sixth array are in series to form a third string, with the first, second and third strings in parallel.

In some embodiments, the energy system is arranged on or in a vehicle.

In some embodiments, the control system receives the input from a local interface of the vehicle.

The term "module" as used herein refers to one of two or more devices or subsystems within a larger system. The module can be configured to work in conjunction with other modules of similar size, function, and physical arrangement (e.g., location of electrical terminals, connectors, etc.). Modules having the same function and energy source(s) can be configured identical (e.g., size and physical arrangement) to all other modules within the same system (e.g., rack or pack), while modules having different functions or energy source(s) may vary in size and physical arrangement. While each module may be physically removable and replaceable with respect to the other modules of the system (e.g., like wheels on a car, or blades in an information technology (IT) blade server), such is not required. For example, a system may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all communication signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. RF communication circuitry can include a transmitter and a receiver (e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including computer and programming languages. A non-exhaustive list of examples includes hardware description languages (HDLs), SystemC, C, C++, C #, Objective-C, Matlab, Simulink, SystemVerilog, System-VHDL, Handel-C, Python, Java, JavaScript, Ruby, HTML, Smalltalk, Transact-SQL, XML, PHP, Golang (Go), "R" language, and Swift, to name a few.

Memory, storage, and/or computer readable media can be shared by one or more of the various functional units present, or can be distributed amongst two or more of them (e.g., as separate memories present within different chips). Memory can also reside in a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. An energy storage system, comprising:

a plurality of arrays, each array comprising at least two modules electrically connected together to output a cumulative voltage signal comprising a superposition of output voltages from each of the at least two modules, wherein each of the modules comprises an energy source connected to a converter configured to selectively generate the output voltage from the energy source;

a plurality of switches, wherein the plurality of switches are external to the converters of the plurality of arrays, wherein the plurality of switches comprise a first group of switches and a second group of switches, wherein the first group of switches connect the plurality of arrays to a DC entity and the second group of switches connect the plurality of arrays to an AC entity; and a control system configured to control the modules of the plurality of arrays to generate the cumulative voltage signal, and configured to control the plurality of switches such that the cumulative voltage signal is output to either a DC entity or an AC entity.

2. The energy storage system of claim 1, wherein the plurality of arrays includes a first array and a second array connected such that the control system is configured to control the plurality of switches to place the first array and the second array in parallel to receive power from or output power to the AC entity.

3. The energy storage system of claim 2, wherein the control system is configured to control the plurality of switches to place the first array and the second array in series to receive power from or output power to the DC entity.

4. The energy storage system of claim 1, wherein the plurality of arrays includes a first array, a second array, a third array, a fourth array, a fifth array, and a sixth array, wherein the control system is configured to control the plurality of switches to connect the first array and the second array to a first line of a multiphase AC interface, the control system is configured to control the plurality of switches to connect the third array and the fourth array to a second line of a multiphase AC interface, and the control system is configured to control the plurality of switches to connect the fifth array and the sixth array to a third line of a multiphase AC interface.

5. The energy storage system of claim 4, wherein the first array and the second array are in parallel when connected to the first line, wherein the third array and the fourth array are in parallel when connected to the second line, and wherein the fifth array and the sixth array are in parallel when connected to the third line.

6. The energy storage system of claim 4, wherein the control system is configured to control the plurality of switches to connect the first array, the third array, and the fifth array to a positive line of a DC interface, and to connect the second array, the fourth array, and the sixth array to a negative line of a DC interface.

7. The energy storage system of claim 6, wherein, when connected to the DC interface, the first array and the second array are in series to form a first string, the third array and the fourth array are in series to form a second string, and the fifth array and the sixth array are in series to form a third string, with the first, second and third strings in parallel.

8. A mobile charge station comprising:

a vehicle; and an energy storage system comprising:

a plurality of arrays, each array comprising at least two modules electrically connected together to output a cumulative voltage signal comprising a superposition of output voltages from each of the at least two modules, wherein each of the modules comprises an energy source connected to a converter configured to selectively generate the output voltage from the energy source;

a plurality of switches, wherein the plurality of switches are external to the converters of the plurality of arrays, wherein the plurality of switches comprise a first group of switches and a second group of switches, wherein the first group of switches connect the plurality of arrays to a DC entity and the second group of switches connect the plurality of arrays to an AC entity; and a control system configured to control the modules of the plurality of arrays to generate the cumulative voltage signal, and configured to control the plurality of switches such that the cumulative voltage signal is output to either a DC entity or an AC entity.

9. The mobile charge station of claim 8, comprising a DC charge tower and cable configured to charge an electric vehicle.

10. The mobile charge station of claim 9, comprising a plurality of doors configured to expose the DC charge tower and the energy storage system within the mobile charge station.

11. The mobile charge station of claim 9, comprising terminals for interfacing with the AC entity for charging the energy source of each module.

12. The mobile charge station of claim 9, comprising terminals for interfacing with a DC entity for charging the energy source of each module.

13. The mobile charge station of claim 8, comprising racks or cabinets in which the energy storage system is arranged.

14. A method, comprising:

receiving, by a control system, an instruction or input to change a configuration of an energy system comprising a plurality of arrays of modules from a first configuration in which the energy system is configured to receive power from or output power to a first entity that is one of a DC entity or an AC entity and a second configuration in which the energy system is configured to receive power from or output power to a second entity that is the other of the DC entity or the AC entity; and changing, by the control system, the configuration of the energy system from the first configuration to the second configuration by controlling a plurality of switches, wherein the plurality of switches are external to converters of the plurality of arrays, wherein the plurality of switches comprise a first group of switches and a second group of switches, wherein the first group of switches connect the plurality of arrays to a DC entity and the second group of switches connect the plurality of arrays to an AC entity.

15. The method of claim 14, wherein each array comprises at least two modules electrically connected together to output a cumulative voltage signal comprising a superposition of output voltages from each of the at least two modules, wherein each of the modules comprises an energy source connected to a converter configured to selectively generate the output voltage from the energy source.

16. The method of claim 14, wherein the control system receives the input from an external control device.

17. The method of claim 14, wherein:

the plurality of arrays includes a first array and a second array; and controlling the plurality of switches comprises placing the first array and the second array in parallel when the second entity is the AC entity.

18. The method of claim 14, wherein:

the plurality of arrays includes a first array and a second array; and controlling the plurality of switches comprises placing the first array and the second array in series when the second entity is the DC entity.

19. The method of claim 14, wherein:

the plurality of arrays includes a first array, a second array, a third array, a fourth array, a fifth array, and a sixth array; and controlling the plurality of switches comprises, connecting the first array and the second array to a first line of a multiphase AC interface, connecting the third array and the fourth array to a second line of a multiphase AC interface, and connecting the fifth array and the sixth array to a third line of a multiphase AC interface.

20. The method of claim 19, wherein the first array and the second array are in parallel when connected to the first line, wherein the third array and the fourth array are in parallel when connected to the second line, and wherein the fifth array and the sixth array are in parallel when connected to the third line.

* * * * *